(12) United States Patent
Suh et al.

(10) Patent No.: US 11,548,962 B2
(45) Date of Patent: Jan. 10, 2023

(54) SELF-HEALING POLYMER NETWORK CONTAINING PHYSICAL CROSSLINKER, COMPOSITION THEREFOR, AND OPTICAL ELEMENT COMPRISING THE SAME

(71) Applicant: INDUSTRY-UNIVERSITY COOPERATION FOUNDATION HANYANG UNIVERSITY, Seoul (KR)

(72) Inventors: Dong Hack Suh, Seongnam-si (KR); Kyoung Hwan Choi, Seoul (KR); Jeong Seop Oh, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 342 days.

(21) Appl. No.: 16/612,855

(22) PCT Filed: May 11, 2018

(86) PCT No.: PCT/KR2018/005434
§ 371 (c)(1),
(2) Date: Nov. 12, 2019

(87) PCT Pub. No.: WO2018/212511
PCT Pub. Date: Nov. 22, 2018

(65) Prior Publication Data
US 2020/0216581 A1 Jul. 9, 2020

(30) Foreign Application Priority Data

May 18, 2017 (KR) .................. 10-2017-0061614
Apr. 2, 2018 (KR) .................. 10-2018-0037929

(51) Int. Cl.
*C08F 220/36* (2006.01)
*C08F 220/34* (2006.01)
(Continued)

(52) U.S. Cl.
CPC ............ *C08F 220/343* (2020.02); *C08F 2/44* (2013.01); *C08F 20/36* (2013.01); *C08F 20/54* (2013.01);
(Continued)

(58) Field of Classification Search
CPC .............. C08F 220/343; C08F 220/346; C08F 220/34; C08F 220/54; C08F 220/56;
(Continued)

(56) References Cited

U.S. PATENT DOCUMENTS 2,990,376 A 6/1961 Bressler et al.
3,557,562 A * 1/1971 McLauglin ............. C08F 20/54
166/295

(Continued)

FOREIGN PATENT DOCUMENTS

KR 10-2015-0113950 A 10/2015
KR 10-2016-0095641 A 8/2016

OTHER PUBLICATIONS

Xie et al., "A simple and versatile approach to self-healing polymers and electrically conductive composites", RSC Adv., 2015, vol. 5, pp. 13261-13269 (9 pages total).
(Continued)

*Primary Examiner* — Ling Siu Choi
*Assistant Examiner* — David L Miller
(74) *Attorney, Agent, or Firm* — Sughrue Mion, PLLC

(57) ABSTRACT

A self-healing polymer network containing a physical crosslinking agent, a composition therefor, and an optical element comprising the same is provided. The self-healing polymer network comprises a polymer derived from monomers
(Continued)

including self-healing monomers each having a first polymerizable functional group and at least one of urethane, urea, or amide group chemically linked to the first polymerizable functional group, wherein the polymer has a backbone formed by polymerizing the first polymerizable functional groups of the self-healing monomers and a plurality of side groups each having at least one of urethane, urea, or amide group chemically linked to the backbone. In addition, the self-healing polymer network comprises a physical cross-linking agent which is an alcohol mixture having at least two of monool, diol, triol, and tetraol or the higher polyol and crosslinking the polymer by physically crosslinking the urethane, urea, or amide group of the side groups.

9 Claims, 14 Drawing Sheets

(51) Int. Cl.
C08F 2/44 (2006.01)
G02B 1/04 (2006.01)
C08F 20/60 (2006.01)
C08F 20/36 (2006.01)
C08F 20/58 (2006.01)
C08F 220/58 (2006.01)
C08F 20/54 (2006.01)
C08F 220/54 (2006.01)
C08F 220/56 (2006.01)

(52) U.S. Cl.
CPC .............. *C08F 20/58* (2013.01); *C08F 20/60* (2013.01); *C08F 220/36* (2013.01); *C08F 220/54* (2013.01); *C08F 220/58* (2013.01); *G02B 1/04* (2013.01); *C08F 220/56* (2013.01)

(58) Field of Classification Search
CPC ........ C08F 220/58; C08F 20/36; C08F 20/54; C08F 20/56; C08F 20/58; C08F 20/60; C08F 22/22; C08F 22/38; C08F 120/36; C08F 120/56; C08F 120/58; C08F 120/60; C08F 122/22; C08F 122/38; C08F 218/24; C08F 218/22; C08F 222/1065; C08F 222/22; C08F 222/38; C08F 2/44

See application file for complete search history.

(56) References Cited

U.S. PATENT DOCUMENTS 5,280,078 A * 1/1994 Gregor .................. B01D 71/40
 525/328.5
2010/0285094 A1* 11/2010 Gupta .................. C08F 222/36
 977/773
2018/0002463 A1 1/2018 Lee et al.

OTHER PUBLICATIONS

Zhu et al., "Self-healing polymers with PEG oligomer side chains based on multiple H-bonding and adhesion properties", J. Polym. Chem., 2015, vol. 6, pp. 5086-5092 (8 pages total).

* cited by examiner

1. Original film   2. Cut   3. Touch

4. Tensile strain   5. Break

Step : 32.91

Step : 29.46

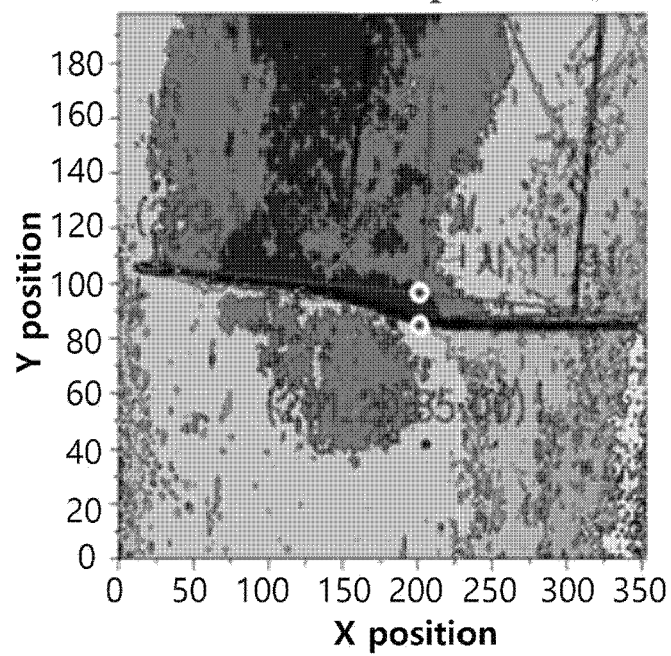

SELF-HEALING POLYMER NETWORK CONTAINING PHYSICAL CROSSLINKER, COMPOSITION THEREFOR, AND OPTICAL ELEMENT COMPRISING THE SAME

CROSS REFERENCE TO RELATED APPLICATIONS

This application is a National Stage of International Application No. PCT/KR2018/005434 filed May 11, 2018, claiming priority based on Korean Patent Application Nos. 10-2017-0061614 filed May 18, 2017 and 10-2018-0037929 filed Apr. 2, 2018.

TECHNICAL FIELD

The present invention relates to a self-healing polymer network and a composition for the same, and more particularly, to self-healing polymer network containing physical crosslinking agent and a composition for the same.

BACKGROUND ART

In general, a polymer product or a polymer composite product has a limit of use due to the expansion of damage initiated by a micro crack. Until recently, in the case of polymers or polymer composites used in aircraft or automobiles, mechanical strength loss caused by micro cracks can cause enormous human and property losses. In addition, in the field of flexible display, which is rapidly developing in recent years, there is much interest in polymers or polymer composites that can overcome or recover damage caused by repeated and continuously generated external force, and various research and development are in progress.

The first methodological proposal of self-healing for polymers is proposed by Professor S. R. White (White, Scott R., et al. "Autonomic healing of polymer composites" Nature 409.6822 (2001): 794-797). This was a method using a metathesis polymerization technique by adding an agent promoting the polymerization in a capsule form in the process of preparing a polymer. However, this is limited in the number of self-healing, and can cause a variety of problems, such as the healed portion is inhomogeneous because it is healed through additional polymerization.

DISCLOSURE

Technical Problem

The present invention is directed to providing a polymer network and a composition therefor capable of continuous and repetitive self-healing by reversible physical interaction.

Technical Solution

One aspect of the present invention provides a self-healing polymer network. The self-healing polymer network comprises a polymer derived from monomers including self-healing monomers each having a first polymerizable functional group and at least one of urethane, urea, or amide group chemically linked to the first polymerizable functional group, wherein the polymer has a backbone formed by polymerizing the first polymerizable functional groups of the self-healing monomers and a plurality of side groups each having at least one of urethane, urea, or amide group chemically linked to the backbone. In addition, the self-healing polymer network comprises a physical crosslinking agent which is an alcohol mixture having at least two of monool, diol, triol, and tetraol or the higher polyol and physically crosslinking the polymer by crosslinking the urethane, urea, or amide group of the side groups.

The monomers may include main monomers in addition to the self-healing monomers. Each of the main monomers may have a second polymerizable functional group, and the first and the second polymerizable functional groups may be functional groups having vinyl groups.

Another aspect of the present invention provides a composition for preparing a self-healing polymer network. The composition comprises 100 parts by weight of an active material and 0.1 to 0.5 parts by weight of a polymerization initiator. The active material contains a self-healing monomer and a physical crosslinking agent. The self-healing monomer has a polymerizable functional group and at least one urethane, urea or amide group chemically linked to the polymerizable functional group, and the physical crosslinking agent is an alcohol mixture having at least two of monool, diol, triol, and tetraol or the higher polyol.

The composition may further comprises a main monomer having a second polymerizable functional group. The first and the second polymerizable functional groups may be functional groups having vinyl groups.

Still another aspect of the present invention provides an optical device. The optical device comprises a lower optical substrate, an upper optical substrate, and a polymer film disposed between the upper optical substrate and the lower optical substrate and having the self-healing polymer network.

Advantageous Effects

According to embodiments of the present invention, the polymer network may be capable of continuous and repetitive self restoration by reversible physical interaction.

The advantageous effects of embodiments of the present invention are not limited to the advantageous effects mentioned above, and other advantageous effects of the present invention can be clearly understood from the description of the claims.

DESCRIPTION OF DRAWINGS

FIG. 3 is a $^1$H-NMR graph measured under the $CD_2Cl_2$ solvent of the self-healing monomer Aa (SRM_A) according to the self-healing monomer preparation example 1a.

FIG. 7 is a $^1$H-NMR graph measured under the $CD_2Cl_2$ solvent of the self-healing monomer Ba (SRM_B) according to the self-healing monomer preparation example 2a.

FIG. 13 is a $^1$H-NMR graph measured under the $CD_2Cl_2$ solvent of the self-healing monomer Ea according to the self-healing monomer preparation example 5a.

FIGS. 19A, 19B, 19C, and 19D show photographs showing wave views from the cases of FIGS. 18A, 18B, 18C, and 18D, respectively.

MODES OF THE INVENTION

Figure 1A:
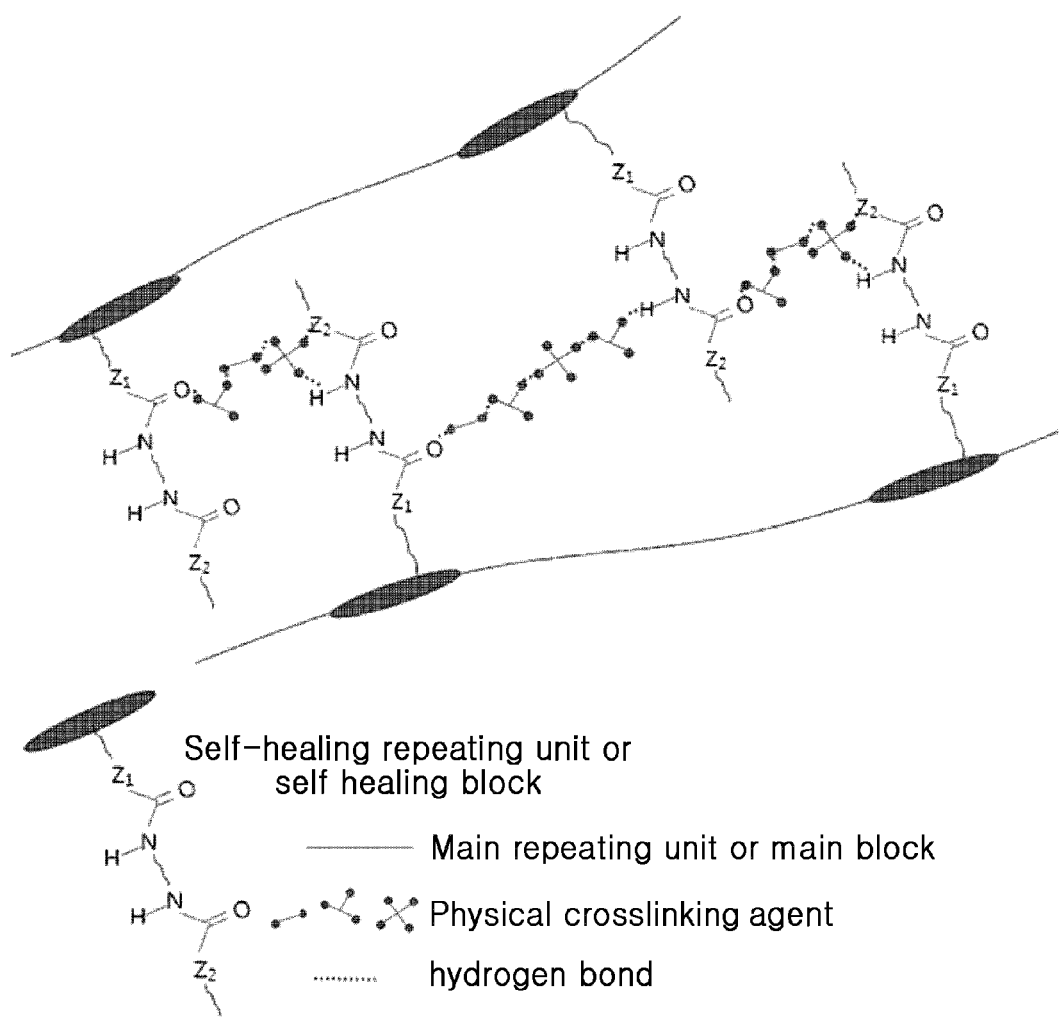
FIGS. 1A to 1C are schematic diagrams illustrating a self-healing process of a self-healing polymer network according to an embodiment of the present invention.

Hereinafter, exemplary embodiments of the present invention will be described in detail with reference to the accompanying drawings in order to describe the present invention in more detail. However, the invention is not limited to the embodiments described herein but may be embodied in other forms.

As used herein, unless otherwise defined, the term "substituted" means that at least one hydrogen in a group is substituted with deuterium, a halogen group, a C1 to C3 alkyl group, or a hydroxy group.

As used herein, unless otherwise defined, an "alkyl group" means an aliphatic hydrocarbon group. The alkyl group may be a "saturated alkyl group" that does not contain any double or triple bonds. The alkyl group may be an "unsaturated alkyl group" containing at least one double or triple bond. The alkyl group, whether saturated or unsaturated, may be branched, straight chain or cyclic. As an example, the alkyl group of C1 to C10 may be a saturated linear aliphatic group, specifically, methyl, ethyl, n-propyl, n-butyl, n-pentyl, n-hexyl, n-heptyl, n-octyl, n-nonyl, or n-decyl.

As used herein, unless otherwise defined, the term "aryl group" means a monocyclic aromatic compound or a polycyclic aromatic compound composed of fused aromatic rings, and includes a heteroaryl group.

As used herein, unless otherwise defined, a "heteroaryl group" means a monocyclic aromatic compound or a polycyclic aromatic compound composed of fused aromatic rings including at least one hetero atom selected from the group consisting of N, O, S, Se, and P in at least one ring and carbon as the remaining members.

In addition, when it is described in this specification as "Cx-Cy," all carbon numbers between x and y should also be interpreted as being described together. In addition, when described herein as "an integer from X to Y", all integers between X and Y should also be interpreted as being described together.

As used herein, the term "halogen group" is an element belonging to Group 17, specifically, a fluorine, chlorine, bromine, or iodine group.

Self-Healing Monomer

The self-healing monomer according to an embodiment of the present invention may include a polymerizable functional group and include at least one urethane, urea or amide group chemically linked to the polymerizable functional group. The polymerizable functional group may be a functional group having a vinyl group, for example, a vinyl group, an acryl group, a methacryl group, an acrylamide group, or a vinyl carbonate group.

An example of the self-healing monomer may be represented by the following Chemical Formula 1.

[Chemical Formula 1]

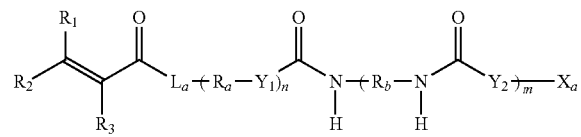

In Chemical Formula 1, $R_1$, $R_2$, and $R_3$ are each independently a hydrogen or a methyl group, $L_a$ is O or NH, $R_a$ is a substituted or unsubstituted C1 to C6 alkyl group or *—$(P_1$-$Q)_a$-$P_2$—*, where * represents a bond, $P_1$ and $P_2$ are each independently a substituted or unsubstituted C1 to C6 alkyl group, Q is O or NH, and a is an integer from 1 to 3, $Y_1$ is O or NH, n is an integer of 0 or 1, $R_b$ is a substituted or unsubstituted C1 to C10 alkyl group, a substituted or unsubstituted C1 to C10 aryl group, a substituted or unsubstituted C1 to C10 cycloalkyl group, or *—$(B_1)_b$-$A_1$-$B_2$-$(A_2)_c$-$(B_3)_d$—*, where * represents a bond, $A_1$ and $A_2$ are each independently a substituted or unsubstituted C1 to C10 aryl group, a substituted or unsubstituted C1 to C10 cycloalkyl group, a substituted or unsubstituted C1 to C25 diarylalkyl group or a substituted or unsubstituted C1 to C25 dicycloalkylalkyl group, $B_1$ and $B_3$ are each independently a substituted or unsubstituted C1 to C6 alkyl group, $B_2$ is a substituted or unsubstituted C1 to C6 alkyl group or *—N=C=N—*, and b, c, and d are integers of 0 or 1 irrespective of each other, $Y_2$ is O or NH, m is an integer of 0 or 1, $X_a$ is one selected from the group consisting of a hydroxy group, a halogen group, a substituted or unsubstituted amine group, a substituted or unsubstituted C1 to C6 alkyl group, a substituted or unsubstituted C1 to C6 alkenyl group, a substituted or unsubstituted C1 to C6 alkynyl group, a substituted or unsubstituted C1 to C6 oxoalkyl group, a substituted or unsubstituted C1 to C10 aryl group, a substituted or unsubstituted C1 to C10 oxoaryl group, a substituted or unsubstituted C1 to C10 cycloalkyl group, a substituted or unsubstituted C1 to C6 alkylcarboxyl group, a substituted or unsubstituted C1 to C6 alkanol group, a substituted or unsubstituted C1 to C6 alkylmercapto group, a substituted or unsubstituted C1 to C6 alkylsulfonic acid, a substituted or unsubstituted C1 to C6 alkylthiocyanate group, a substituted or unsubstituted C1 to C6 alkylphosphate group, a substituted or unsubstituted C1 to C6 alkylnitro group, a substituted or unsubstituted C1 to C6 alkylnitroso group, a substituted or unsubstituted C1 to C6 alkylnitrile group, a substituted or unsubstituted C1 to C6 alkyl isocyanate group, a substituted or unsubstituted C1 to C5 alkylcyanate group, a substituted or unsubstituted C1 to C5 alkylazo group, a substituted or unsubstituted C1 to C6 alkylazide group, a substituted or unsubstituted C1 to C6 alkylazide group, a substituted or unsubstituted C1 to C6 ketimine group, a substitution of C1 to C6 aldimine group, and a substituted or unsubstituted C1 to C6 amide group.

The substituted aryl group of $R_b$ may be a toluene group, for example, toluene-2,4-diyl group, toluene-2,6-diyl group, or toluene-3,5-diyl group, and the substituted or unsubstituted cycloalkyl group of $R_b$ may be cyclohexyl, for example cyclohexyl-1,4-diyl or cyclohexyl-1,3-diyl.

*—$(B_1)_b$-$A_1$-$B_2$-$(A_2)_c$-$(B_3)_d$—* may be, for example,

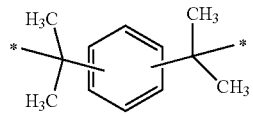

($B_1$ is an isopropyl group, b is 1, $A_1$ is phenyl, $B_2$ is an isopropyl group, c and d are 0), diphenylmethane (b is 0, $A_1$ is phenyl, $B_2$ is methane, $A_2$ is phenyl, c is 1, d is 0), dicyclohexylmethane (b is 0, $A_1$ is cyclohexyl, $B_2$ is methane, $A_2$ is cyclohexyl, c is 1, d is 0),

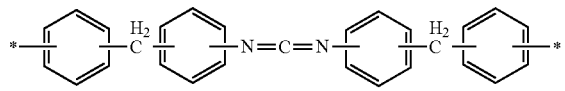

(b is 0, $A_1$ is diarylmethane, $B_2$ is *—N=C=N—*, $A_2$ is diarylmethane, c is 1, d is 0), or

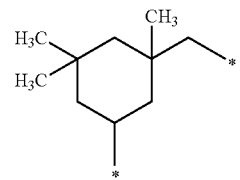

(b=0, $A_1$ is 2,2,4-trimethylcycloalkyl, $B_2$ is methyl, c and d is 0).

The self-healing monomer represented by Chemical Formula 1 may be represented by the following Chemical Formula 1A, 1B, or 1C.

[Chemical Formula 1A]

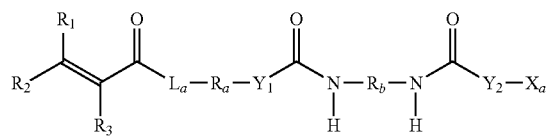

In Chemical Formula 1A, $R_1$, $R_2$, $R_3$, $L_a$, $R_a$, $Y_1$, $R_b$, $Y_2$, and $X_a$ are as defined in Chemical Formula 1.

[Chemical Formula 1B]

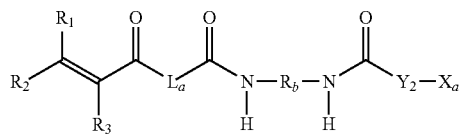

In Chemical Formula 1B, $R_1$, $R_2$, $R_3$, $L_a$, $R_b$, $Y_2$, and $X_a$ are as defined in Chemical Formula 1.

[Chemical Formula 1C]

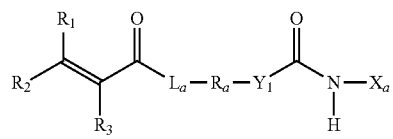

In Chemical Formula 1C, $R_1$, $R_2$, $R_3$, $L_a$, $R_a$, $Y_1$, and $X_a$ are as defined in Chemical Formula 1.

Examples of the self-healing monomer represented by Chemical Formula 1 or 1A may be represented by the following Chemical Formulas 11-18 and 22-23.

[Chemical Formula 11]

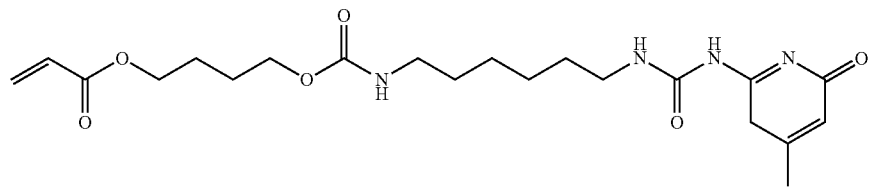

[Chemical Formula 12]

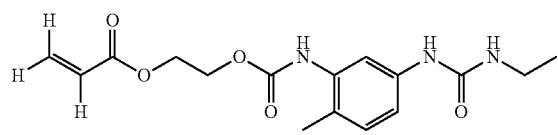

[Chemical Formula 14]

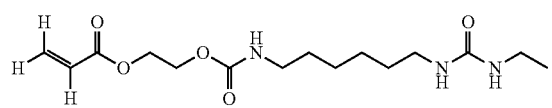

[Chemical Formula 16]

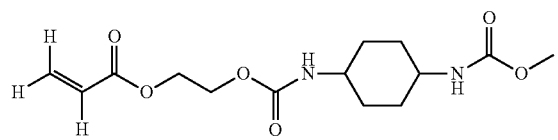

[Chemical Formula 18]

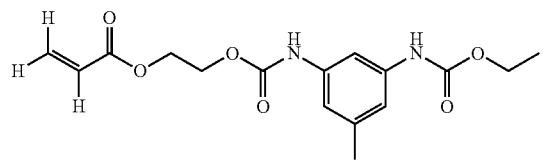

[Chemical Formula 13]

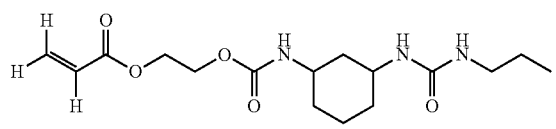

[Chemical Formula 15]

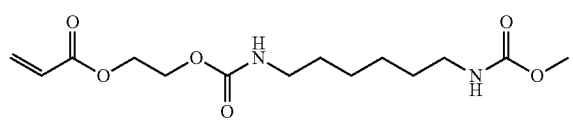

[Chemical Formula 17]

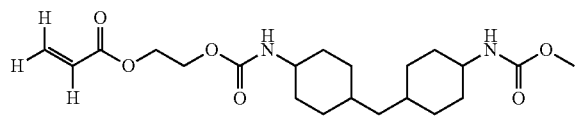

[Chemical Formula 22]

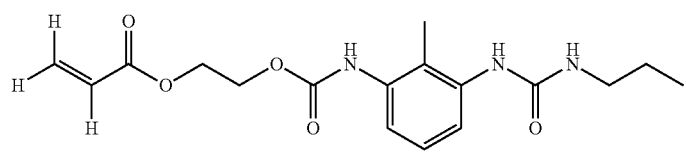

[Chemical Formula 23]

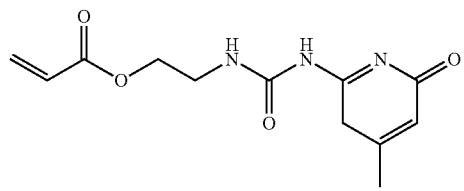

Example of the self-healing monomer represented by Chemical Formula 1 or 1B may be represented by the following Chemical Formula 21.

[Chemical Formula 21]

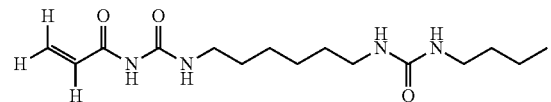

Examples of the self-healing monomer represented by Chemical Formula 1 or 1C may be represented by the following Chemical Formulas 19-20.

[Chemical Formula 19]

[Chemical Formula 20]

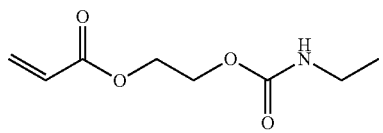

Main Monomer

The main monomer according to an embodiment of the present invention may also have a polymerizable functional group. The polymerizable functional group may be a functional group having a vinyl group, for example, a vinyl group, an acryl group, a methacryl group, an acrylate group, a methacrylate group, an acrylamide group, or a vinyl carbonate group. The polymerizable functional group provided in the self-healing monomer and the polymerizable functional group provided in the main monomer may both be functional groups having vinyl groups, but specific types thereof may be different from each other. In other words, the polymerizable functional group provided in the self-healing monomer and the polymerizable functional group provided in the main monomer are each independently selected from the group consisting of, a vinyl group, an acryl group, a methacryl group, an acrylate group, a methacrylate group, an acrylamide group, and a vinyl carbonate group.

The main monomer may be represented by the following Chemical Formula 2 as an example.

[Chemical Formula 2]

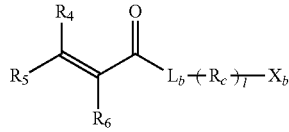

In Chemical Formula 2, $R_4$, $R_5$, and $R_6$ are each independently a hydrogen or a methyl group, $L_b$ is O or NH, $R_c$ is a substituted or unsubstituted C1 to C6 alkyl group or *—$(P_1-Q)_a-P_2$—*, where * represents a bond, $P_1$ and $P_2$ are each independently substituted or unsubstituted C1 to C6 alkyl group, Q is O or NH, and a is an integer from 1 to 3, l is an integer of 0 or 1, $X_b$ is one selected from the group consisting of a hydroxy group, a halogen group, a substituted or unsubstituted amine group, a substituted or unsubstituted C1 to C6 alkyl group, a substituted or unsubstituted C1 to C6 alkenyl group, a substituted or unsubstituted C1 to C6 alkynyl group, a substituted or unsubstituted C1 to C6 oxoalkyl group, a substituted or unsubstituted C1 to C10 aryl group, a substituted or unsubstituted C1 to C10 oxoaryl group, a substituted or unsubstituted C1 to C10 cycloalkyl group, a substituted or unsubstituted C1 to C6 alkylcarboxyl group, a substituted or unsubstituted C1 to C6 alkanol group, a substituted or unsubstituted C1 to C6 alkylmercapto group, a substituted or unsubstituted C1 to C6 alkylsulfonic acid, a substituted or unsubstituted C1 to C6 alkylthiocyanate group, a substituted or unsubstituted C1 to C6 alkylphosphate group, a substituted or unsubstituted C1 to C6 alkylnitro group, a substituted or unsubstituted C1 to C6 alkylnitroso group, a substituted or unsubstituted C1 to C6 alkylnitrile group, a substituted or unsubstituted C1 to C6 alkyl isocyanate group, a substituted or unsubstituted C1 to C5 alkylcyanate group, a substituted or unsubstituted C1 to C5 alkylazo group, a substituted or unsubstituted C1 to C6 alkylazide group, a substituted or unsubstituted C1 to C6 alkylazide group, a substituted or unsubstituted C1 to C6 ketimine group, a substitution of C1 to C6 aldimine group, and a substituted or unsubstituted C1 to C6 amide group.

Examples of the main monomer represented by Chemical Formula 2 may be represented by the following Chemical Formulas 24-27.

[Chemical Formula 24]

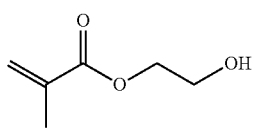

[Chemical Formula 25]

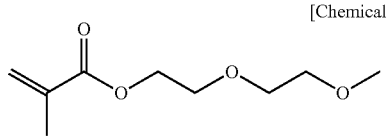

[Chemical Formula 26]

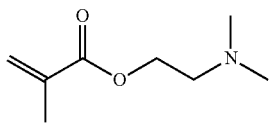

[Chemical Formula 27]

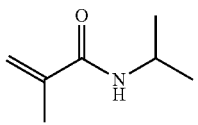

Physical Crosslinking Agent

A physical crosslinking agent or healer according to one embodiment of the present invention may be an alcohol mixture having at least two of a monohydric alcohol, that is, a monool; a dihydric alcohol, that is, a diol; a trihydric alcohol, that is, a triol; and a higher polyol having 4 or more hydroxyl groups. Such physical crosslinking agent may be in a gel state at room temperature. As an example, the physical crosslinking agent may contain 0 to 55 mol % of monool, 20 to 95 mol % of diol, 0 to 60 mol % of triol, and 5 to 20 mol % of tetraol or higher polyol. Specifically, the physical crosslinking agent may contain 5 to 30 mol % of monool, 20 to 60 mol % of diol, 20 to 60 mol % of triol, and 5 to 20 mol % of tetraol or higher polyol.

The monool may be a C1 to C12 alkyl alcohol, for example, methanol, ethanol, propanol, butanol, pentanol, hexanol, heptanol, octanol, nonenol, decanol, undecanol, or dodecanol.

The diol may be a C1 to C12 alkanediol or an oligomer of C1 to C3 alkylene oxide. Alkanediol of C1 to C12 may be ethylene glycol, 1,3-propanediol, 1,4-butanediol, 1,5-pentanediol, 1,6-hexanediol, 1,7-haptandiol, or 1,8-octanediol. The oligomer of the C1 to C3 alkylene oxide may be an oligomer of ethylene oxide, for example, may be diethylene glycol, triethylene glycol, tetraethylene glycol, or pentaethylene glycol.

The triol is glycerol (or 1,2,3-propanetriol), 1,2,4-butanetriol, 1,2,6-hexanetriol, or 1,1,1-tris (hydroxymethyl)propane.

The tetraol or higher polyol may be pentaerythritol (tetraol), pentaerythritol ethoxylate (tetraol), or a sugar alcohol represented by $(CHOH)_nH_2$ (n is an integer of 4 to 6) for example, erythritol (meso-erythritol, n=4), threitol (n=4), arabitol ((2R,4R)-pentane-1,2,3,4,5-pentol, n=5), xylitol ((2R,3r,4S)-pentane-1,2,3,4,5-pentol, n=5), ribitol (2R,3s, 4S-pentane-1,2,3,4,5-pentol), sorbitol ((2S,3R,4R,5R)-hexane-1,2,3,4,5,6-hexol, n=6), or mannitol ((2R,3R,4R, 5R)-hexane-1,2,3,4,5,6-hexol, n=6).

Composition for Preparing Self-Healing Polymer Network

The composition for preparing a self-healing polymer network according to an embodiment of the present invention may contain 100 parts by weight of the active material for the self-healing polymer network and 0.1 to 0.5 parts by weight of a polymerization initiator. The polymerization initiator may be one or a combination thereof selected from the group consisting of 2-hydrooxy-2-methylpropiophenone, 2,2-diethoxyacetophenone, and 1-hydroxycyclohexyl phenyl ketone. The composition for preparing the self-healing polymer network may additionally contain a solvent, wherein the solvent may be contained in an amount of 0.01 to 5 parts by weight. The solvent may be one selected from chloroform, dichloromethane, dimethylformamide, tetrahydrofuran, or a combination thereof.

The active material for the self-healing polymer network may contain a self-healing monomer and a physical crosslinking agent, and may include 40 to 70 wt % of the self-healing monomer and 30 to 60 wt % of the physical crosslinking agent. As another example, the active material for the self-healing polymer network may further contain a main monomer in addition to the self-healing monomer and the physical crosslinking agent, specifically, 5 to 20 wt % of the self-healing monomer, 30 to 60 wt % of the main monomer, and 30 to 60 wt % of the physical crosslinking agent.

The self-healing monomer may be as described above, but may be a monomer represented by Chemical Formula 1 as an example, and further, the composition for preparing the self-healing polymer network may contain at least one self-healing monomer represented by the one selected from the group of Chemical Formulas 1A, 1B, and 1C. Furthermore, the composition for preparing the self-healing polymer network may include at least one self-healing monomer represented by the one selected from the group of Chemical Formulas 11-23.

In addition, the main monomer may be as described above, but may be, for example, the monomer represented by Chemical Formula 2, furthermore, the composition for preparing the self-healing polymer network may include at least one main monomer represented by the one selected from the group of Chemical Formula 24 to 27.

Self-Healing Polymer Network

A self-healing polymer network according to an embodiment of the present invention contains a polymer derived from active monomers including self-healing monomers each having a first polymerizable functional group and at least one of urethane, urea, or amide group chemically linked to the first polymerizable functional group, and a physical crosslinking agent that physically crosslinking the polymer. The polymer may have a backbone formed by polymerizing the first polymerizable functional groups of the self-healing monomers and a plurality of side groups each having at least one of urethane, urea, or amide group chemically linked to the backbone. The first polymerizable functional group may be a functional group having a vinyl group, for example, a vinyl group, an acryl group, a methacryl group, an acrylate group, a methacrylate group, an acrylamide group, or a vinyl carbonate group. Such a self-healing polymer network may be obtained by curing the composition for preparing the self-healing polymer network described above. The curing may be an ultraviolet curing.

As an example, the polymer may include a repeating unit represented by the following Chemical Formula 3, wherein the polymer is a polymer in which the self-healing monomer represented by Chemical Formula 1 is polymerized.

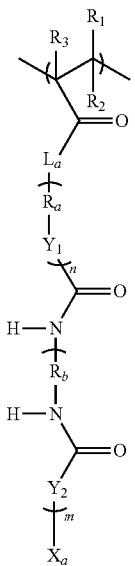

[Chemical Formula 3]

In Chemical Formula 3, $R_1$, $R_2$, $R_3$, $L_a$, $R_a$, $Y_1$, n, $R_b$, $Y_2$, m, and $X_a$ are as defined in Chemical Formula 1.

As another example, the self-healing polymer network includes a polymer derived from active monomers including the self-healing monomers and main monomers, and the physical crosslinking agent that physically crosslinking the polymer. Here, the polymer may be a random copolymer derived from the self-healing monomers and the main monomers. As an example, the polymer may be a polymer that is a random copolymer derived from the self-healing monomer represented by Chemical Formula 1 and the main monomer represented by Chemical Formula 2. The polymer may have repeating unit represented by the following Chemical Formula 4.

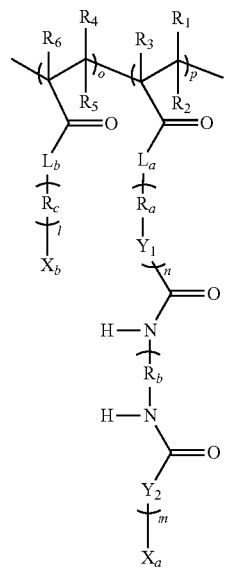

[Chemical Formula 4]

In Chemical Formula 4 $R_1$, $R_2$, $R_3$, $L_a$, $R_a$, $Y_1$, n, $R_b$, $Y_2$, m, and $X_a$ are as defined in Chemical Formula 1, $R_4$, $R_5$, $R_6$, $L_b$, $R_c$, 1, and $X_b$ are as defined in Chemical Formula 2, o is an integer from 2 to 10000, p is an integer from 2 to 10000.

In addition, the self-healing polymer network may include at least one repeating unit derived from the self-healing monomers represented by Chemical Formulas 1A, 1B, and 1C. Furthermore, the self-healing polymer network may include at least one repeating unit derived from the self-healing monomers represented by Chemical Formulas 11-23.

In addition, the self-healing polymer network may include at least one repeating unit derived from the main monomer represented by Chemical Formulas 24 to 27.

Figure 1B:
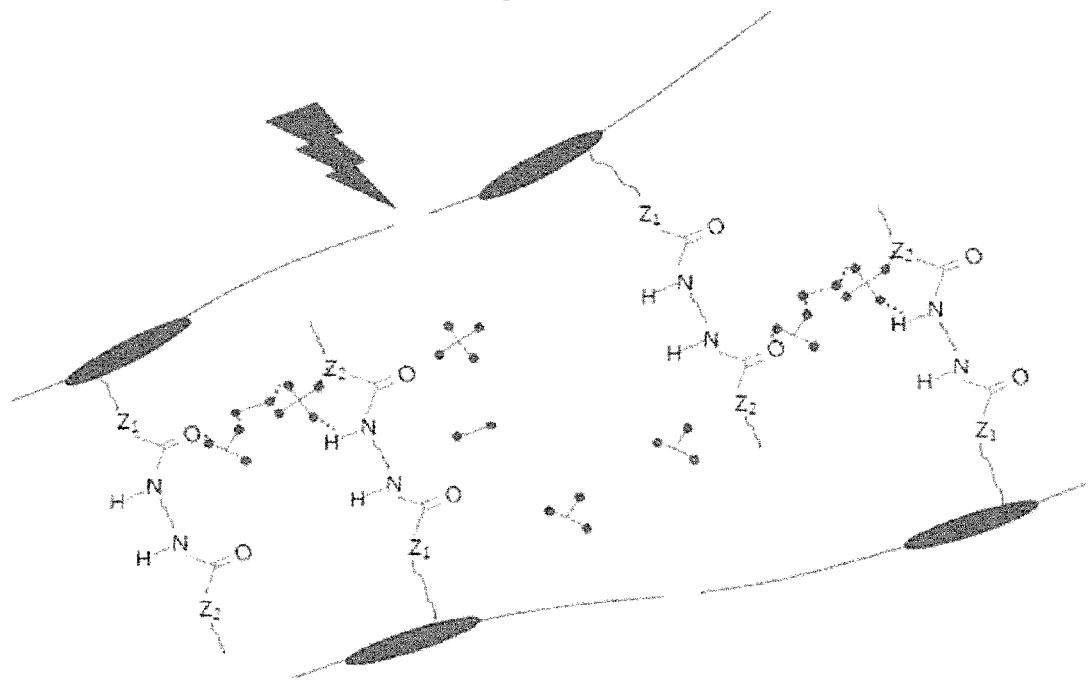
Figure 1C:
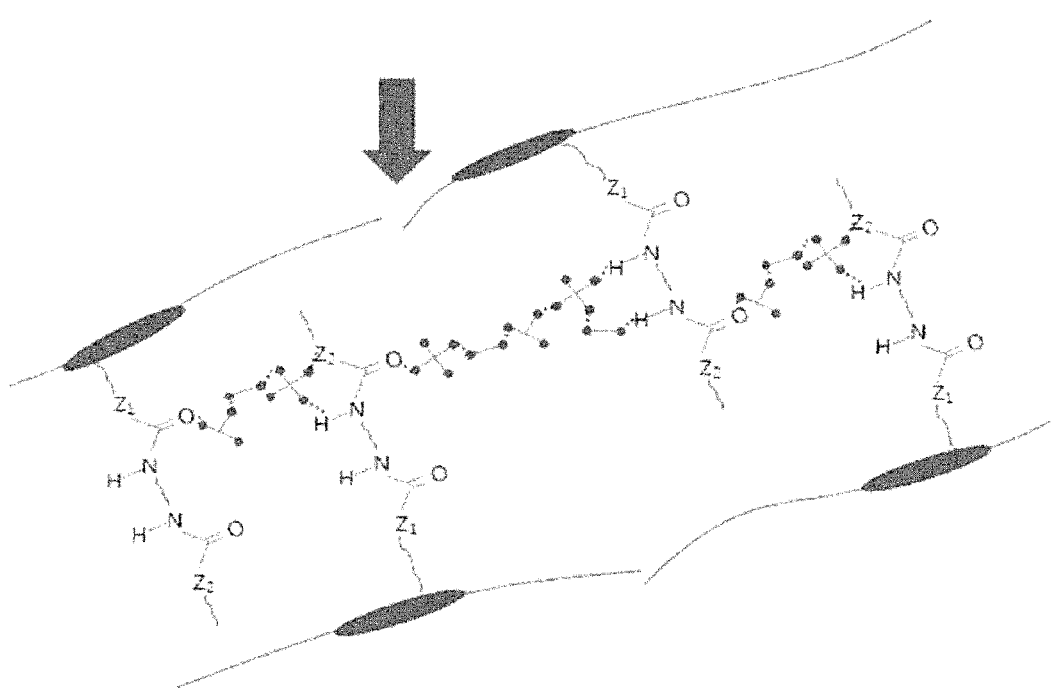

FIGS. 1A to 1C are schematic diagrams illustrating a self-healing process of a self-healing polymer network according to an embodiment of the present invention.

Referring to FIG. 1A, a self-healing polymer network is disclosed.

The polymer network comprises a plurality of polymer chains each having a self-healing repeating unit derived from a self-healing monomer having a first polymerizable functional group and at least one urethane, urea or amide group chemically linked to the first polymerizable functional group and a main repeating unit derived from a main monomer having a second polymerizable functional group; and a physical crosslinking agent that physically crosslinks the polymer chains. Each of the chains may include a self-healing block which has a plurality of self-healing repeating units and which is a block in which a plurality of self-healing monomers are polymerized. In the self-healing repeating unit, $Z_1$ and $Z_2$ may be a bond, O, or NH regardless of each other, specifically $Z_1$ may be $L_a$ or $Y_1$ of Chemical Formula 1, and $Z_2$ may be $Y_2$ of Chemical Formula 1. In addition, each chain may have a main block which has a plurality of main repeating units and which is a block in which a plurality of main monomers are polymerized. Unlike the illustration, however, the polymer chains may not have a main repeating unit or main block.

For example, the polymer chains may be random copolymer chains in which the self-healing monomer represented by Chemical Formula 1 and the main monomer represented by Chemical Formula 2 are randomly copolymerized. The main repeating unit in which the main monomer is polymerized not only plays a major role in forming the polymer to show mechanical properties, but also serve as spacers that allow the physical crosslinking agent to work better by adjusting the distance between self-healing repeating units in which the self-healing monomers are polymerized.

In the polymer network, the side functional groups of the self-healing repeating units may be positioned between backbones of the polymer which is derived from polymerizing the first polymerizable functional group of the self-healing monomer and additionally the second polymerizable functional group of the main monomer. Here, the side functional groups or hanging pendants of the self-healing repeating units may include at least one urea group ($Z_1$ or $Z_2$ is NH), a urethane group ($Z_1$ or $Z_2$ is O), or an amide group ($Z_1$ or $Z_2$ is a bond).

The pair of pendants hanging from the adjacent backbones of the polymer may be physically crosslinked by the physical crosslinking agent. Specifically, the physically crosslinking may be a crosslinking by hydrogen bonds. Specifically, at least one urea group, urethane group or amide group provided in each of the pair of pendants may be physically crosslinked by the physical crosslinking agent. The physical crosslinking agent is a mixture of alcohols containing at least two of monools, diols, triols, and tetraol or higher polyols, and may be, for example, in a gel state at room temperature. Such physical crosslinking agents may have fluidity within the polymer network even in the absence or lack of external media such as moisture. In addition, the physical crosslinking agent may form a chain by hydrogen bonding between alcohols. Here, since each of the triol and the tetraol or higher polyol has three or more hydroxyl groups, it is possible to implement a strong hydrogen bond and increase the rigidity of the polymer network; the diol can lengthen the hydrogen bond chain; and the monool can terminate the hydrogen bond chain.

The polymer network may have a form of a freestanding film or a coating film coated on another medium, but is not limited thereto.

Referring to FIG. 1B, an impact may be applied to the polymer network, thereby damaging the polymer network. At the damaged site, the polymer chains may break and physical crosslinking may be impaired.

Referring to FIG. 1c, the damaged area may be contacted again at room temperature and passed for 1 to 3 minutes. At this time, the physical crosslinking agent having fluidity in the polymer network may move to the damaged site, and may restore physical crosslinking again. Specifically, at least one urea group, urethane group, or amide group provided in each of the pair of hanging pendants may be re-crosslinked due to hydrogen bonding through the physical crosslinking agents.

As such, the physical crosslinking agent, which is an alcohol mixture having fluidity in the polymer network, may recover the polymer network very quickly without adding water onto the damaged part in the process of recovering the polymer network.

Optical Device comprising Polymer Film containing Self-Healing Polymer Network

Figure 2:
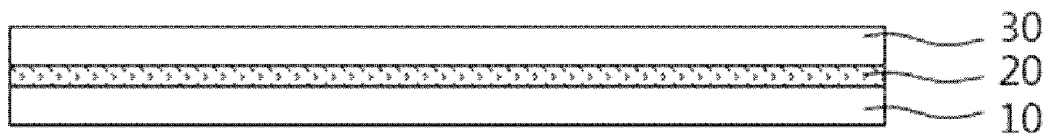
FIG. 2 is a cross-sectional view showing an optical device according to an embodiment of the present invention.

FIG. 2 is a cross-sectional view showing an optical device according to an embodiment of the present invention.

Referring to FIG. 2, a lower substrate 10 and an upper substrate 30 may be provided. The lower substrate 10 and the upper substrate 30 may be optical substrates, and specifically, flexible optical films. Here, the optical substrate may mean any substrate that generates, transmits or modulates the light used in the optical device. As an example, the lower substrate 10 or the upper substrate 30 may include a display panel, for example, a liquid crystal display (LCD) panel, an organic light emitting diode (OLED) panel; a base film; an encapsulation film; a touch sensor panel; a polarizing film; or a cover film. In this case, the OLED panel may be a flexible panel, and the touch sensor panel may also be a flexible panel.

Meanwhile, the polymer film 20 may be positioned between the lower substrate 10 and the upper substrate 30. To this end, after applying the above-described self-healing polymer network composition on any one of the lower substrate 10 and the upper substrate 30, the other one of the lower substrate 10 and the upper substrate 30 may be positioned to cover the composition, and the composition may be cured by irradiating ultraviolet rays to the composition through any one of the lower substrate 10 and the upper substrate 30. In this case, the composition may be changed to a polymer film having the self-healing polymer network described above. The polymer film 20 may be optically transparent, and serves to bond the lower substrate 10 and the upper substrate 30 to remove air gaps therebetween, thereby improving durability and optical characteristics of the optical device.

When the external force is applied to the optical device, in particular, when the flexible optical device is bended, folded, or unfolded, the polymer film 20 may be also damaged, the polymer chain and the physical crosslinking may be broken at the damaged part. However, after making the optical device left in its original form so that the damaged portions of the polymer film 20 could come into contact with each other, and elapsing a predetermined time, the physical crosslinking agent having fluidity in the polymer network as described above can move to the damaged portion and restore physical crosslinking again. As such, due to the physical crosslinking agent, which is an alcohol mixture having fluidity in the polymer network, restoration may occur at a damaged portion to recover the polymer network, thereby increasing durability of the flexible optical device.

Hereinafter, preferred examples are provided to aid the understanding of the present invention. However, the following experimental examples are only for helping understanding of the present invention, and the present invention is not limited to the following experimental examples.

Self-Healing Monomer Preparations

Self-Healing Monomer Preparation Example 1: Preparation of Urethane Urea Acrylate

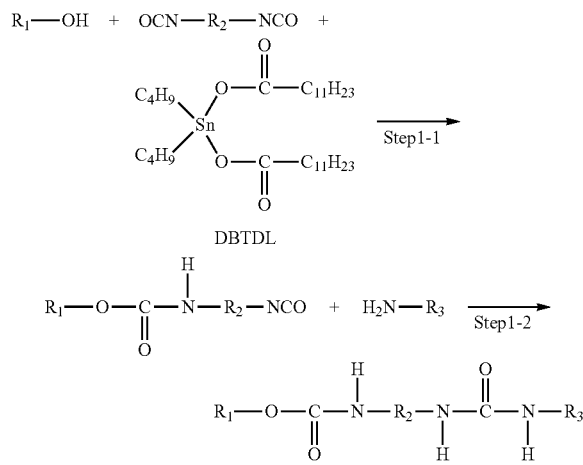

Self-Healing Monomer Preparation Example 1a: Preparation of SRM_A 1,6-hexane diisocyanate ($R_2$ of Scheme 1: hexane group, 10 mmol), toluene (6 ml), mequinol (0.01 g), dibutyltin dilaurate (DBTDL, 3.6 mg) were put into a round bottom flask and stirred for 10 minutes in a nitrogen atmosphere. After raising the temperature of the reaction solution to 60° C., 4-hydroxybutyl acrylate ($R_1$ of Scheme 1: butyl acrylate group, 10 mmol) was slowly injected dropwise while stirring the reaction solution.

After 1 hour, 4-methyl-6-oxo-3,6-dihydropyridin-2-yl amine ($R_3$ of Scheme 1: 4-methyl-6-oxo-3,6-dihydropyridin-2-yl group, 10 mmol) was injected at once and stirred for 1 hour. The isocyanate group was identified by FT-IR at 2270 cm$^{-1}$ and the reaction was terminated when no peak was seen for this group. The remaining solvent was removed in a vacuum rotary concentrator to obtain a self-healing monomer Aa (SRM_A). The structure of the obtained self-healing monomer Aa (SRM_A) is shown in Chemical Formula 11 (yield: 92%).

[Chemical Formula 11]

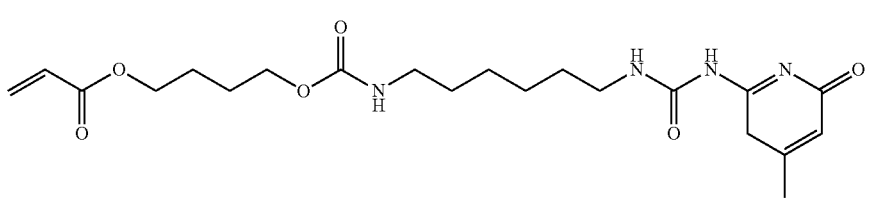

Figure 3:
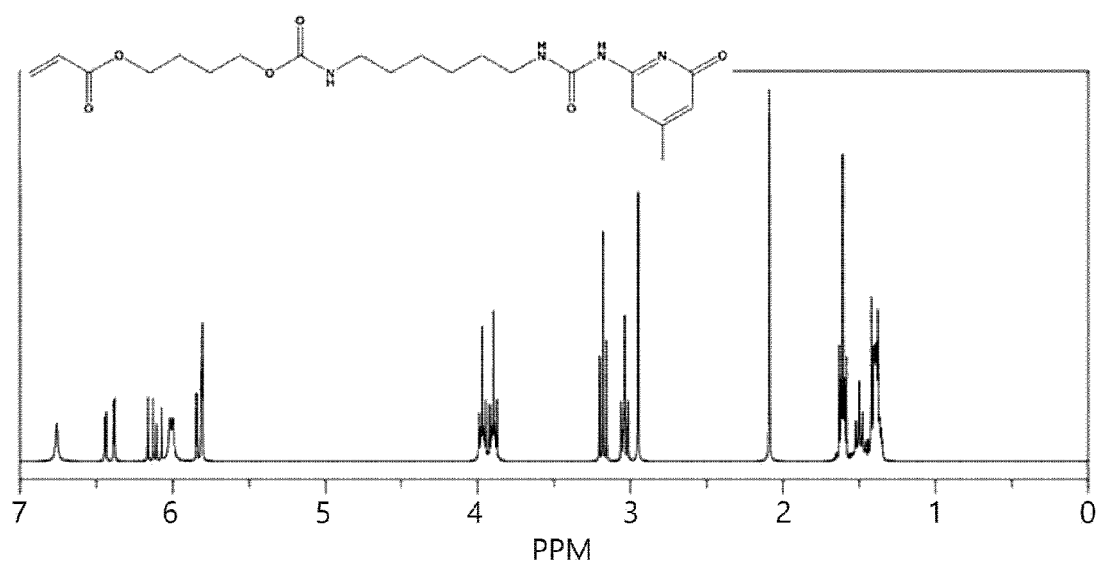

4-(6-(3-(4-methyl-6-oxo-3,6-dihydropyridin-2-yl) ureido)hexylcarbamoyloxy) butyl acrylate FIG. 3 is a $^1$H-NMR graph measured under the CD$_2$Cl$_2$ solvent of the self-healing monomer Aa (SRM_A) according to the self-healing monomer Preparation Example 1a.

Self-Healing Monomer Preparation Example 1b

A self-healing monomer Ab was obtained using the same method as the self-healing monomer preparation Example 1a, except that 2,4-toluene diisocyanate ($R_2$ of Scheme 1: toluene-2,4-yl group) was used instead of 1,6-hexane diisocyanate, 2-hydroxyethyl acrylate ($R_1$ of Scheme 1: ethyl acrylate group) was used instead of 4-hydroxybutyl acrylate, and ethylamine ($R_3$ of Scheme 1: ethyl group) was used instead of 4-methyl-6-oxo-3,6-dihydropyridin-2-yl amine. The structure of the obtained self-healing monomer Ab is shown in Chemical Formula 12 (yield: 95%).

[Chemical Formula 12]

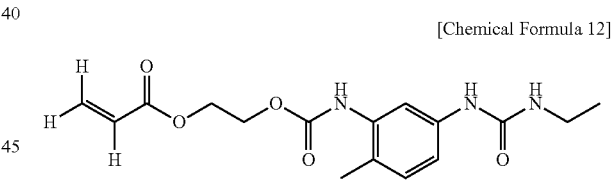

2-(((5-(3-ethylureido)-2-methylphenyl) carbamoyl) oxy) ethylacrylate

Figure 4:
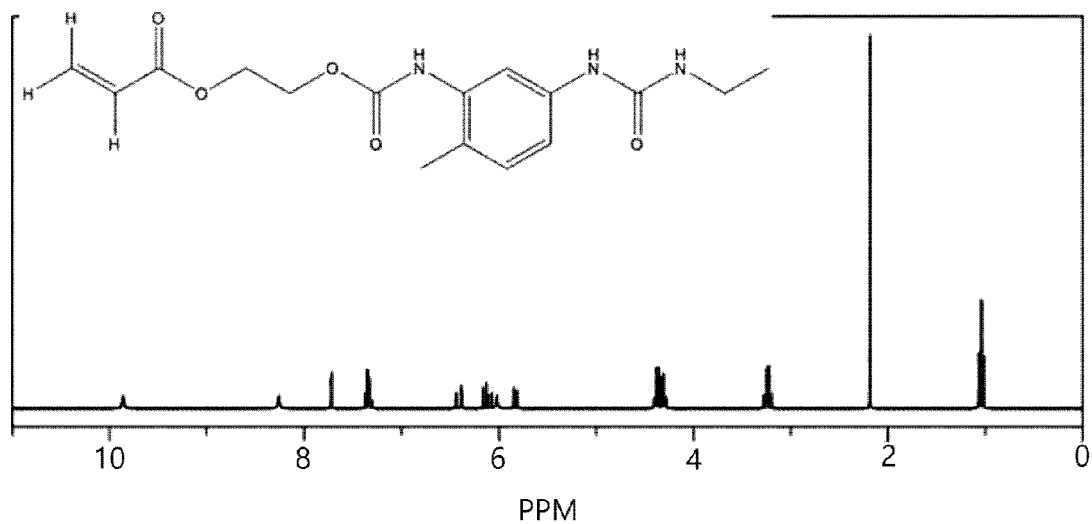
FIG. 4 is a $^1$H-NMR graph measured under the $CD_2Cl_2$ solvent of the self-healing monomer Ab according to the self-healing monomer preparation example 1b.

FIG. 4 is a $^1$H-NMR graph measured under the CD$_2$Cl$_2$ solvent of the self-healing monomer Ab according to the self-healing monomer Preparation Example 1b.

Self-Healing Monomer Preparation Example 1c

A self-healing monomer Ac was obtained using the same method as the self-healing monomer preparation Example 1a, except that 1,3-cyclohexane diisocyanate ($R_2$ of Scheme 1: cyclohexane-1,3-diyl group) was used instead of 1,6-hexane diisocyanate, 2-hydroxyethyl acrylate ($R_1$ of Scheme 1: ethyl acrylate group) was used instead of 4-hydroxybutyl acrylate, and n-propylamine ($R_3$ of Scheme 1: n-propyl group) was used instead of 4-methyl-6-oxo-3,6-dihydropyridin-2-yl amine. The structure of the obtained self-healing monomer Ac is shown in Chemical Formula 13 (yield: 94%).

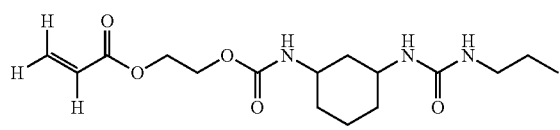

2-(((3-(3-propylureido)cyclohexyl)carbamoyl)oxy)ethylacrylate

Figure 5:
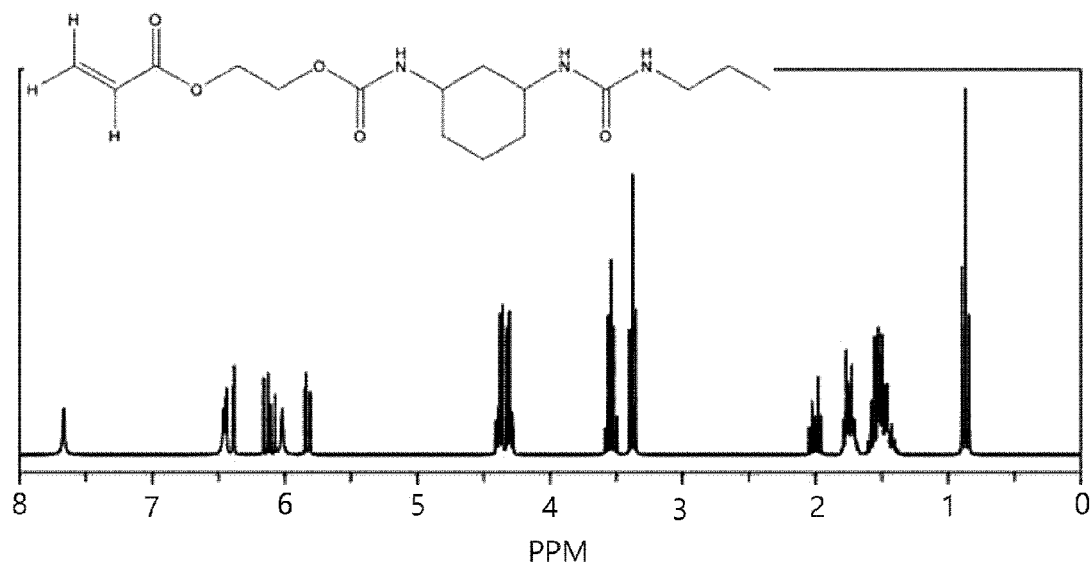
FIG. 5 is a $^1$H-NMR graph measured under the $CD_2Cl_2$ solvent of the self-healing monomer Ac according to the self-healing monomer preparation example 1c.

FIG. 5 is a ¹H-NMR graph measured under the $CD_2Cl_2$ solvent of the self-healing monomer Ac according to the self-healing monomer Preparation Example 1c.

Self-Healing Monomer Preparation Example 1 d

A self-healing monomer Ad was obtained using the same method as the self-healing monomer preparation Example 1a, except that 2-hydroxyethyl acrylate ($R_1$ of Scheme 1: ethyl acrylate) was used instead of 4-hydroxybutyl acrylate, and ethylamine ($R_3$ of Scheme 1: ethyl group) was used instead of 4-methyl-6-oxo-3,6-dihydropyridin-2-yl amine. The structure of the obtained self-healing monomer Ad is shown in Chemical Formula 14 (yield: 96%).

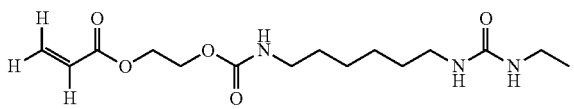

4,13-dioxo-14-oxa-3,5,12-triazohexadeken-16-ylacrylate

Figure 6:
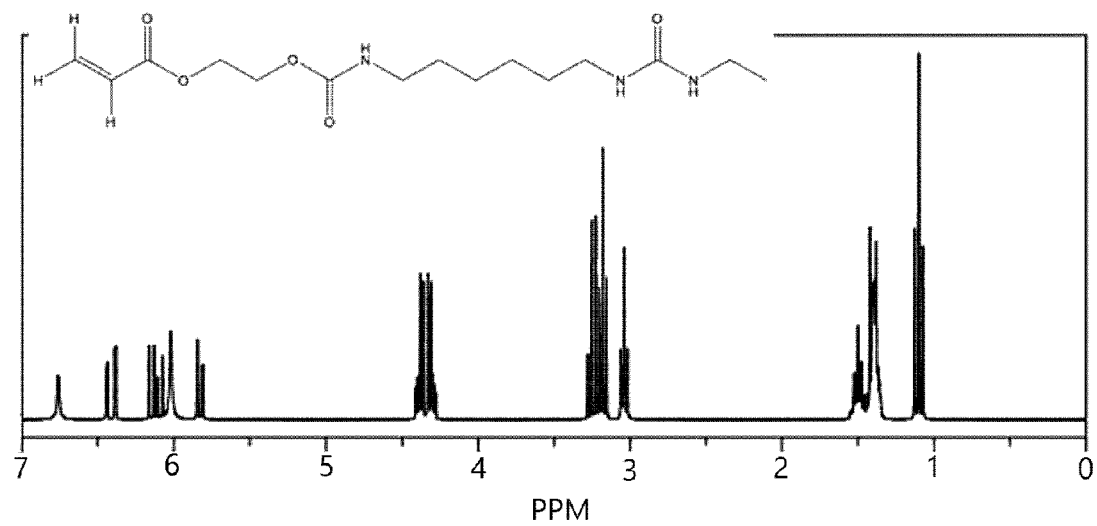
FIG. 6 is a $^1$H-NMR graph measured under the $CD_2Cl_2$ solvent of the self-healing monomer Ad according to the self-healing monomer preparation example 1 d.

FIG. 6 is a ¹H-NMR graph measured under the $CD_2Cl_2$ solvent of the self-healing monomer Ad according to the self-healing monomer Preparation Example 1 d.

Self-Healing Monomer Preparation Example 2: Preparation of Diurethane Acrylate

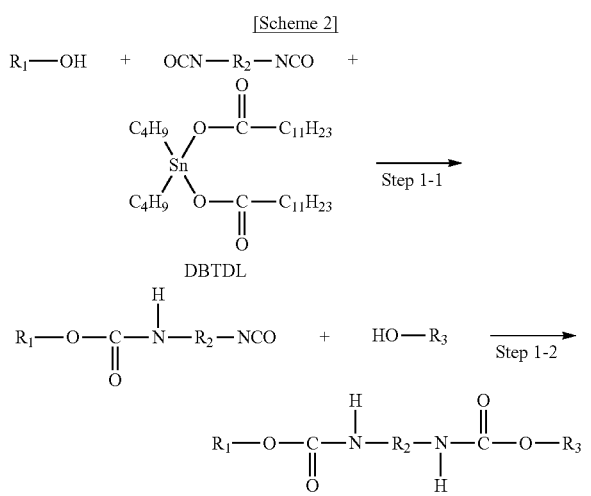

Self-Healing Monomer Preparation Example 2a: Preparation of SRM_B 1,6-hexane diisocyanate ($R_2$ of Scheme 2: hexane group, 10 mmol), toluene (6 ml), mequinol (0.01 g), dibutyltin dilaurate (DBTDL, 3.6 mg) were put into a round bottom flask and stirred for 10 minutes in a nitrogen atmosphere. After raising the temperature of the reaction solution to 60° C., 2-hydroxyethyl acrylate ($R_1$ of Scheme 2: ethyl acrylate group, 10 mmol) was slowly injected dropwise while stirring the reaction solution.

After 1 hour, methanol ($R_3$ of Scheme 2: methyl group, 10 mmol) was injected at once and stirred for 1 hour. The isocyanate group was identified by FT-IR at 2270 $cm^{-1}$ and the reaction was terminated when no peak was seen for this group. The remaining solvent was removed in a vacuum rotary concentrator to obtain a self-healing monomer Ba (SRM_B). The structure of the obtained self-healing monomer Ba (SRM_B) is shown in Chemical Formula 15 (yield: 85%).

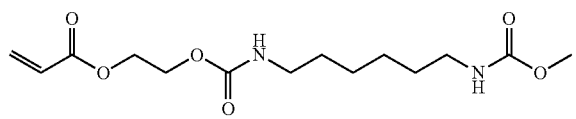

3,12-dioxo-2,13-dioxa-4,11-diazapentadecane-15-yl acrylate

Figure 7:
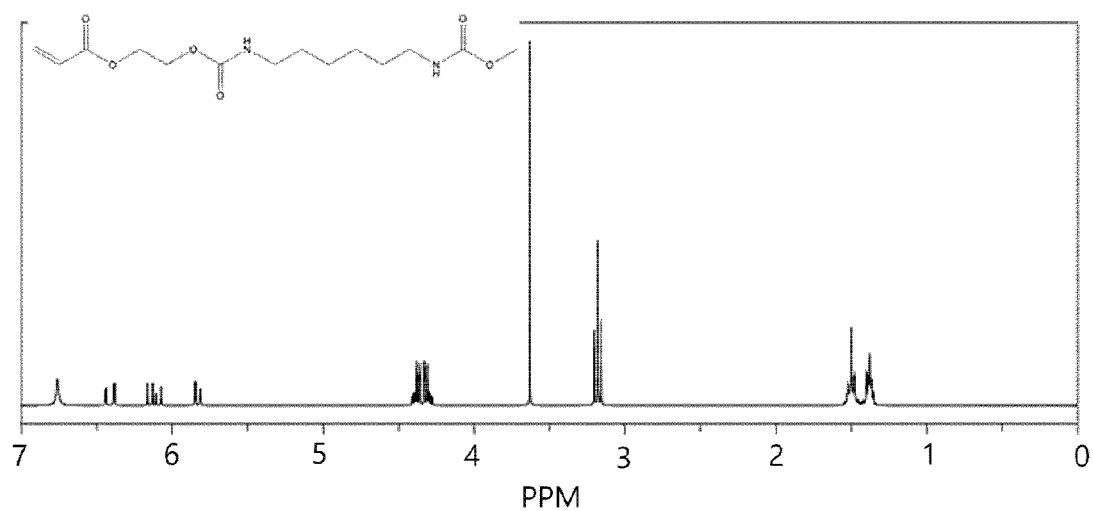

FIG. 7 is a ¹H-NMR graph measured under the $CD_2Cl_2$ solvent of the self-healing monomer Ba (SRM_B) according to the self-healing monomer preparation example 2a.

Self-Healing Monomer Preparation Example 2b

A self-healing monomer Bb was obtained using the same method as the self-healing monomer preparation Example 2a, except that 1,4-cyclohexane diisocyanate ($R_2$ of Scheme 2: cyclohexane-1,4-diyl group) was used instead of 1,6-hexane diisocyanate. The structure of the obtained self-healing monomer Bb is shown in Chemical Formula 16 (yield: 93%).

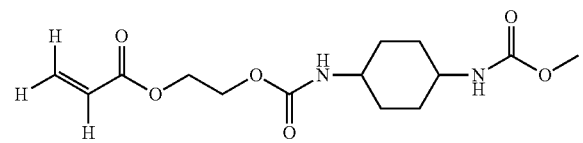

2-(((4-((methoxycarbonyl)amino)cyclohexyl)carbamoyl)oxy)ethylacrylate

Figure 8:
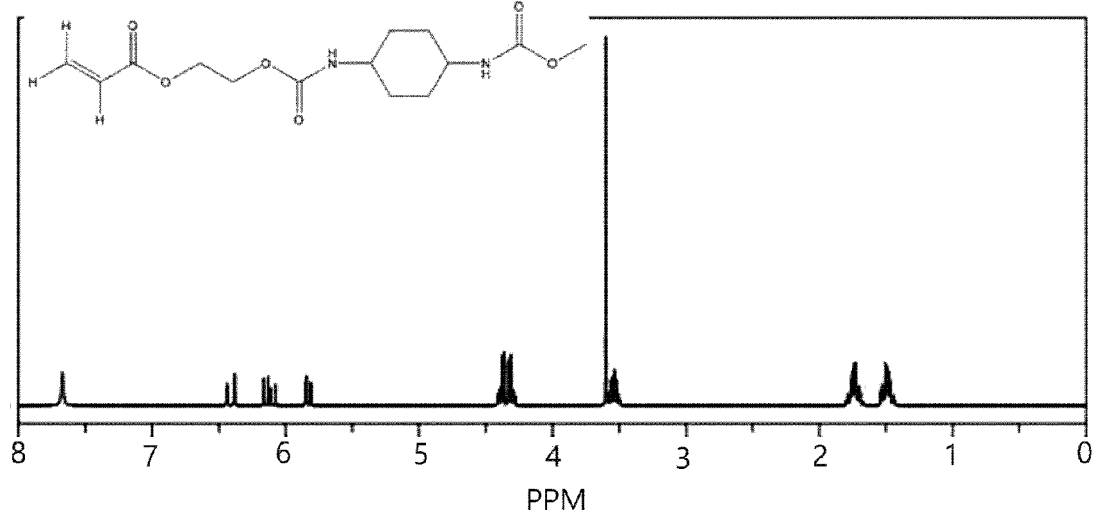
FIG. 8 is a $^1$H-NMR graph measured under the $CD_2Cl_2$ solvent of the self-healing monomer Bb according to the self-healing monomer preparation example 2b.

FIG. 8 is a ¹H-NMR graph measured under the $CD_2Cl_2$ solvent of the self-healing monomer Bb according to the self-healing monomer preparation example 2b.

Self-Healing Monomer Preparation Example 2c

A self-healing monomer Bc was obtained using the same method as the self-healing monomer preparation Example 2a, except that dicyclohexylmethane 4,4'-diisocyanate ($R_2$ of Scheme 2: dicyclohexylmethane 4,4'-diyl group) was used instead of 1,6-hexane diisocyanate. The structure of the obtained self-healing monomer Bc is shown in Chemical Formula 17 (yield: 94%).

[Chemical Formula 17]

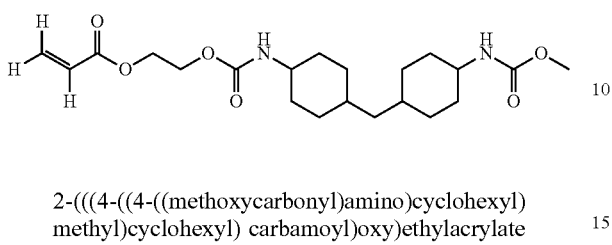

Figure 9:
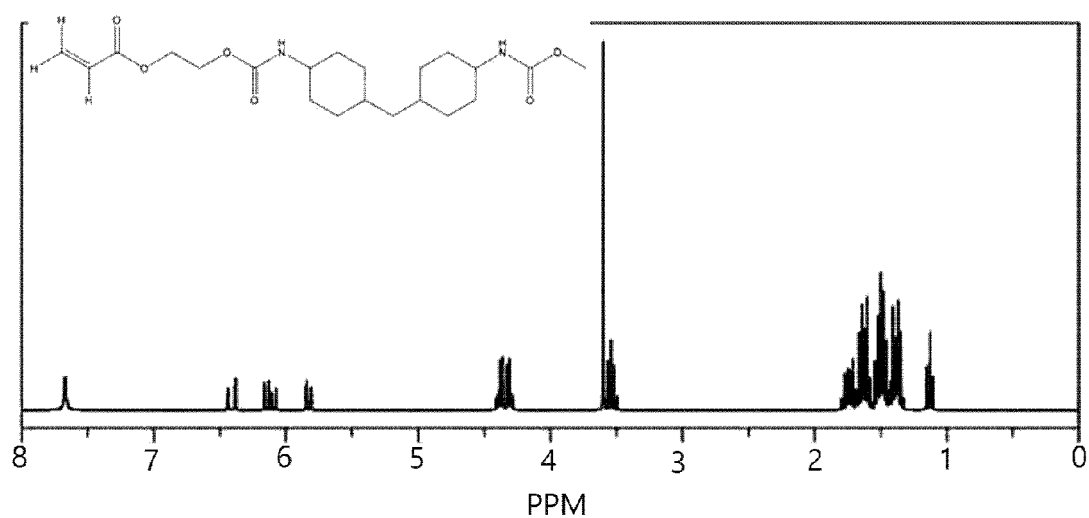
FIG. 9 is a $^1$H-NMR graph measured under the $CD_2Cl_2$ solvent of the self-healing monomer Bc according to the self-healing monomer preparation example 2c.

2-(((4-((4-((methoxycarbonyl)amino)cyclohexyl) methyl)cyclohexyl) carbamoyl)oxy)ethylacrylate FIG. 9 is a $^1$H-NMR graph measured under the $CD_2Cl_2$ solvent of the self-healing monomer Bc according to the self-healing monomer preparation example 2c.

Self-Healing Monomer Preparation Example 2d

A self-healing monomer Bd was obtained using the same method as the self-healing monomer preparation Example 2a, except that 3,5-toluene diisocyanate ($R_2$ of Scheme 2: toluene-3,5-diyl group) was used instead of 1,6-hexane diisocyanate. The structure of the obtained self-healing monomer Bd is shown in Chemical Formula 18 (yield: 94%).

[Chemical Formula 18]

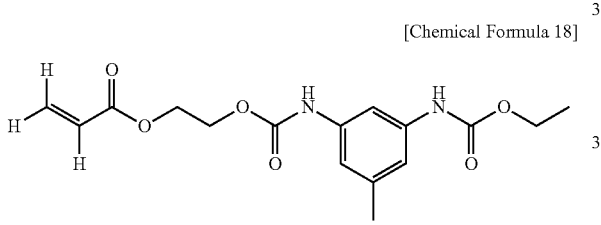

2-(((3-((ethoxycarbonyl) amino)-5-methylphenyl) carbamoyl) oxyl) ethylacrylate

Figure 10:
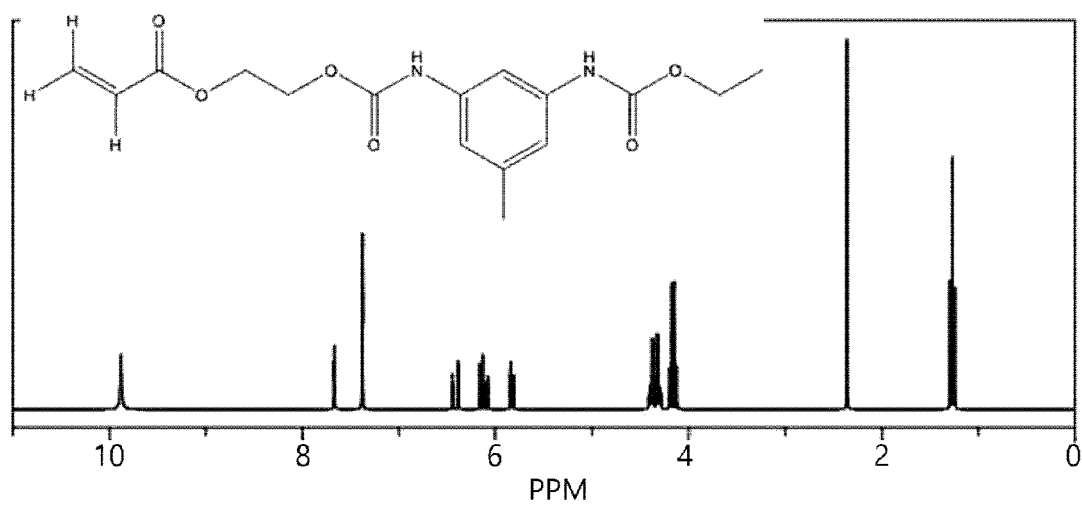
FIG. 10 is a $^1$H-NMR graph measured under the $CD_2Cl_2$ solvent of the self-healing monomer Bd according to the self-healing monomer preparation example 2d.

FIG. 10 is a $^1$H-NMR graph measured under the $CD_2Cl_2$ solvent of the self-healing monomer Bd according to the self-healing monomer preparation example 2d.

Self-Healing Monomer Preparation Example 3: Preparation of Urea Acrylate

[Scheme 3]

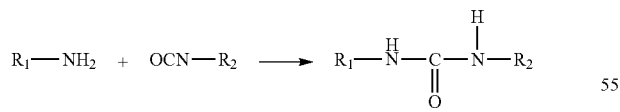

4-methyl-6-oxo-3,6-dihydropyridin-2-yl isocyanate ($R_2$ of Scheme 3: 4-methyl-6-oxo-3,6-dihydropyridin-2-yl group, 10 mmol), toluene (6 ml), and mequinol (0.01 g) were put into a round bottom flask and stirred for 10 minutes in a nitrogen atmosphere. After raising the temperature of the reaction solution to 60° C., 2-aminoethyl acrylate ($R_1$ of Scheme 3: ethyl acrylate group, 10 mmol) was slowly injected dropwise while stirring the reaction solution. The isocyanate group was identified by FT-IR at 2270 cm$^{-1}$ and the reaction was terminated when no peak was seen for this group. The remaining solvent was removed in a vacuum rotary concentrator to obtain a self-healing monomer C (SRM_C). The structure of the obtained self-healing monomer C (SRM_C) is shown in Chemical Formula 19 (yield: 92%).

[Chemical Formula 19]

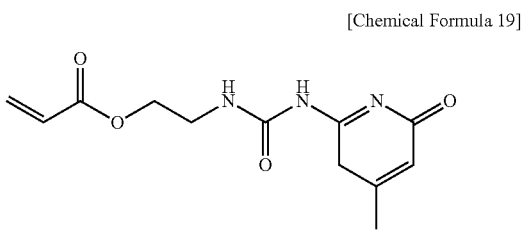 [SMILES: C=CC(=O)OCCNC(=O)NC1=NC(=O)C=C(C)C1]

2-(3-(4-methyl-6-oxo-3,6-dihydropyridin-2-yl) ureido)ethylacrylate

Figure 11:
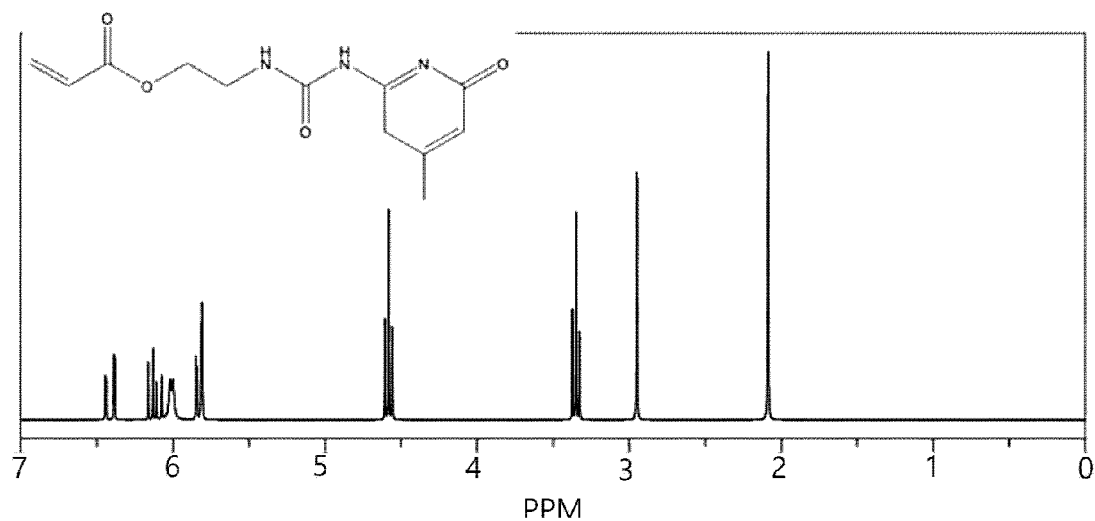
FIG. 11 is a $^1$H-NMR graph measured under the $CD_2Cl_2$ solvent of the self-healing monomer C (SRM_C) according to the self-healing monomer preparation example 3.

FIG. 11 is a $^1$H-NMR graph measured under the $CD_2Cl_2$ solvent of the self-healing monomer C (SRM_C) according to the self-healing monomer Preparation Example 3.

Self-Healing Monomer Preparation Example 4: Preparation of Urethane Acrylate

[Scheme 4]

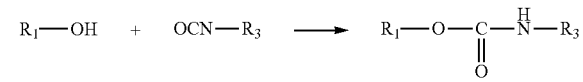

ethyl isocyanate ($R_3$ of Scheme 4: ethyl group, 10 mmol), toluene (6 ml), mequinol (0.01 g) and dibutyltin dilaurate (DBTDL, 3.6 mg) were put into a round bottom flask and stirred for 10 minutes in a nitrogen atmosphere. After raising the temperature of the reaction solution to 60° C., 2-hydroxyethyl acrylate ($R_1$ of Scheme 4: ethyl acrylate group, 10 mmol) was slowly injected dropwise while stirring the reaction solution. The isocyanate group was identified by FT-IR at 2270 cm$^{-1}$ and the reaction was terminated when no peak was seen for this group. The remaining solvent was removed in a vacuum rotary concentrator to obtain a self-healing monomer D (SRM_D). The structure of the obtained self-healing monomer D (SRM_D) is shown in Chemical Formula 20 (yield: 87%).

[Chemical Formula 20]

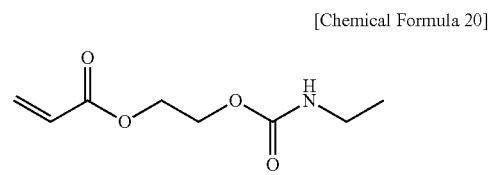

2-(ethylcarbamoyloxy) ethyl acrylate

Figure 12:
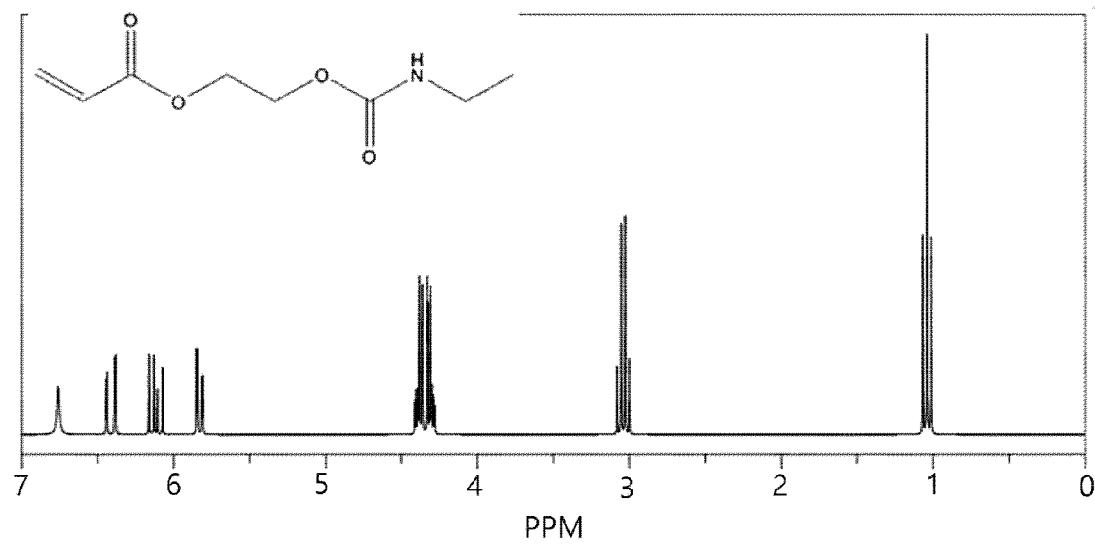
FIG. 12 is a $^1$H-NMR graph measured under the $CD_2Cl_2$ solvent of the self-healing monomer D (SRM_D) according to the self-healing monomer preparation example 4.

FIG. 12 is a $^1$H-NMR graph measured under the $CD_2Cl_2$ solvent of the self-healing monomer D (SRM_D) according to the self-healing monomer Preparation Example 4.

Self-Healing Monomer Preparation Example 5: Preparation of Diurea Acrylate

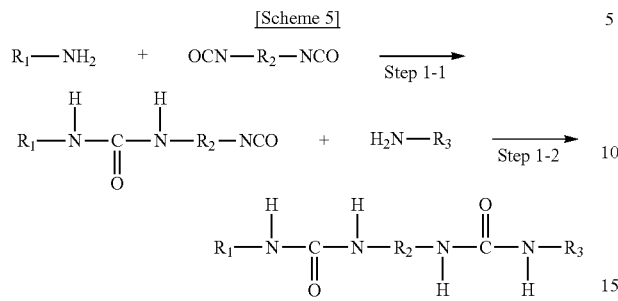

Self-Healing Monomer Preparation Example 5a:

1,6-hexane diisocyanate (R$_2$ of Scheme 5: hexane group, 10 mmol), toluene (6 ml), and mequinol (0.01 g) were put into a round bottom flask and stirred for 10 minutes in a nitrogen atmosphere. After raising the temperature of the reaction solution to 60° C., acrylamide (R$_1$ of Scheme 5: CH$_2$CHCO—, 10 mmol) was slowly injected dropwise while stirring the reaction solution.

After 1 hour, n-butyl amine (R$_3$ of Scheme 5: butyl group, 10 mmol) was injected at once and stirred for 1 hour. The isocyanate group was identified by FT-IR at 2270 cm$^{-1}$ and the reaction was terminated when no peak was seen for this group. The remaining solvent was removed in a vacuum rotary concentrator to obtain a self-healing monomer Ea (yield: 96%). The structure of the obtained self-healing monomer Ea is shown in Chemical Formula 21.

[Chemical Formula 21]

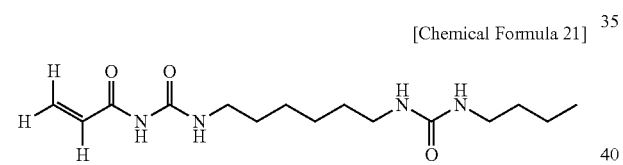

N-(6-(3-butylureido)hexyl)carbamoyl)acrylamide

Figure 13:
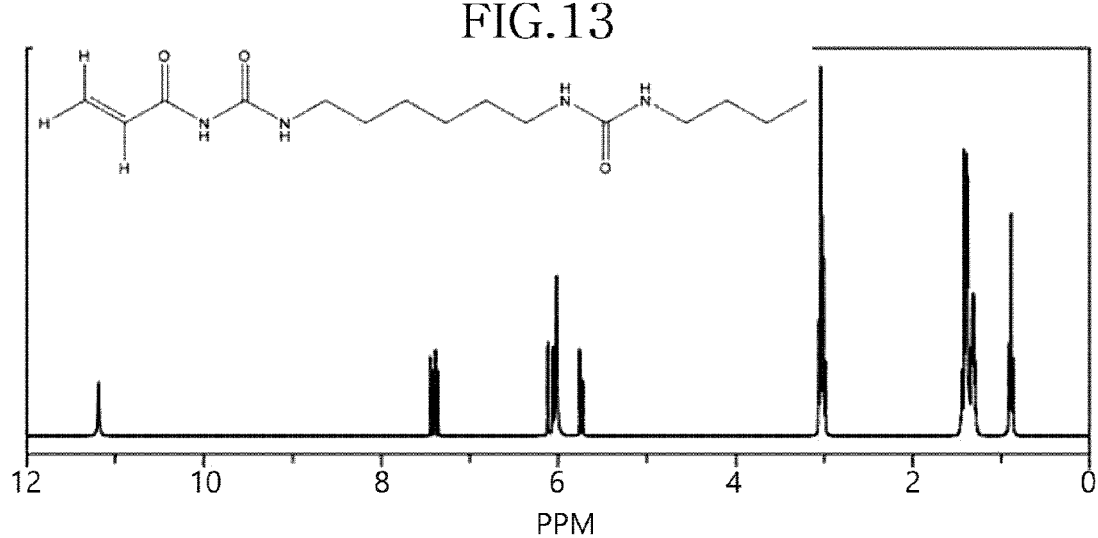

FIG. 13 is a $^1$H-NMR graph measured under the CD$_2$Cl$_2$ solvent of the self-healing monomer Ea according to the self-healing monomer preparation example 5a.

Self-Healing Monomer Preparation Example 5b

A self-healing monomer Eb was obtained using the same method as the self-healing monomer preparation Example 5a, except that isophorone diisocyanate was used instead of 1,6-hexane diisocyanate, 2-aminoethyl acrylate (R$_1$ of Scheme 5: ethyl acrylate group) was used instead of acrylamide, and methylamine (R$_3$ of Scheme 5: methyl group) was used instead of n-butyl amine (yield: 97%). The structure of the obtained self-healing monomer Eb is shown in Chemical Formula 22.

[Chemical Formula 22]

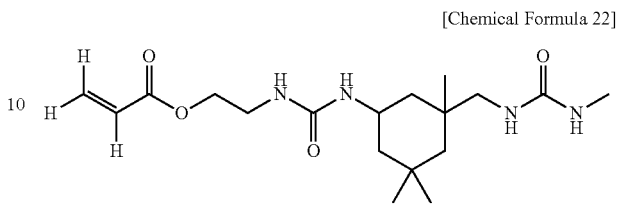

Figure 14:
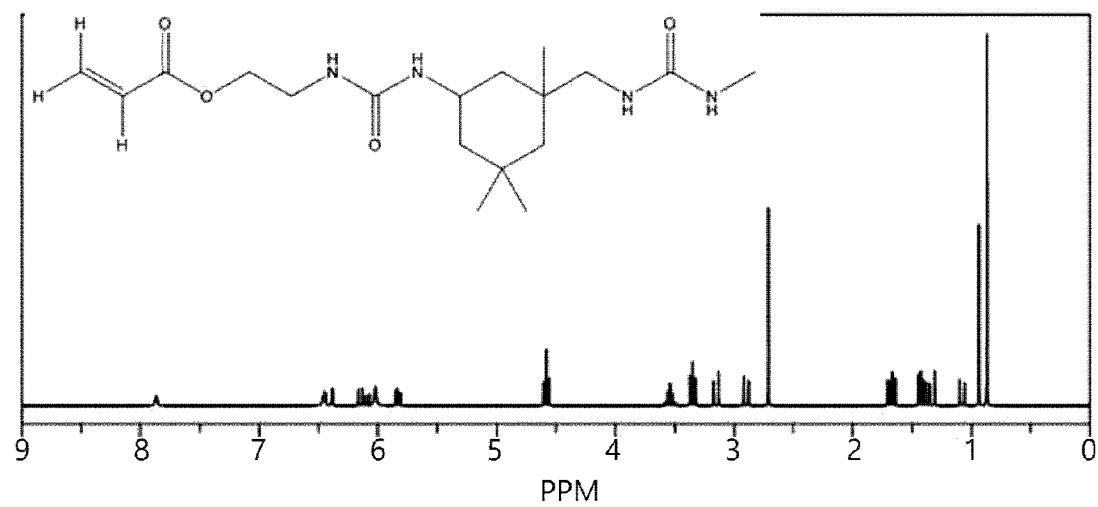
FIG. 14 is a $^1$H-NMR graph measured under the $CD_2Cl_2$ solvent of the self-healing monomer Eb according to the self-healing monomer preparation example 5b.

2-(3-(3,3,5-trimethyl-5-((3-methylureido)methyl)cyclohexyl)ureido) ethylacrylate FIG. 14 is a $^1$H-NMR graph measured under the CD$_2$Cl$_2$ solvent of the self-healing monomer Eb according to the self-healing monomer preparation example 5b.

Self-Healing Monomer Preparation Example 5c

A self-healing monomer Ec was obtained using the same method as the self-healing monomer preparation Example 5a, except that 2,6-toluene diisocyanate (R$_2$ of Scheme 5: toluene-2,6-diyl group) was used instead of 1,6-hexane diisocyanate, 2-aminoethyl acrylate (R$_1$ of Scheme 5: ethyl acrylate group) was used instead of acrylamide, and n-propyl amine (R$_3$ of Scheme 5: n-propyl group) was used instead of n-butyl amine. The structure of the obtained self-healing monomer Ec is shown in Chemical Formula 23 (yield: 95%).

[Chemical Formula 23]

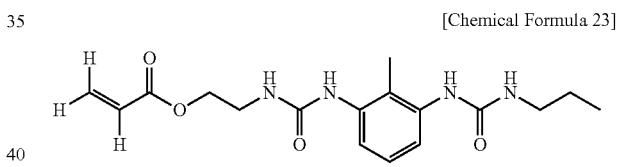

2-(3-(2-methyl-3-(3-propylureido)phenyl)ureido)ethylacrylate

Figure 15:
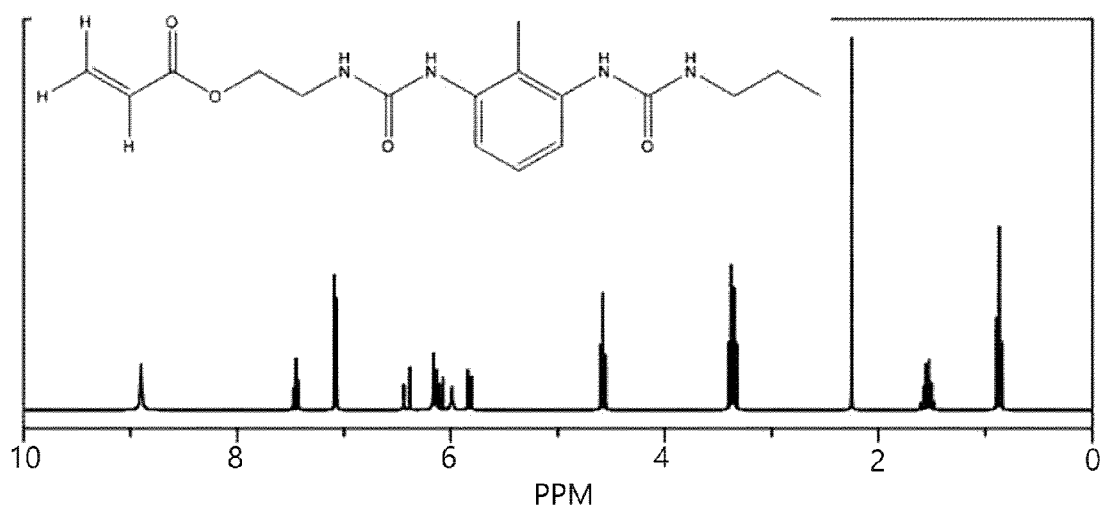
FIG. 15 is a $^1$H-NMR graph measured under the $CD_2Cl_2$ solvent of the self-healing monomer Ec according to the self-healing monomer preparation example 5c.

FIG. 15 is a $^1$H-NMR graph measured under the CD$_2$Cl$_2$ solvent of the self-healing monomer Ec according to the self-healing monomer preparation example 5c.

Healer Composition Preparation Example

Physical crosslinking agent compositions, i.e., healer compositions 1 to 20 were prepared by mixing monools, diols, triols and multiols (polyols) in a content ratio as described in Table 1 below.

TABLE 1

| | compositions | | | | | | | | |
|---|---|---|---|---|---|---|---|---|---|
| | monools | | diols | | triols | | multiols | | |
| | species | wt % | species | wt % | species | wt % | species | wt % | state |
| healer 1 | butanol | 10 | ethylene glycol | 40 | glycerol | 40 | xylitol | 10 | liquid |
| healer 2 | | 10 | | 20 | | 50 | | 20 | gel |
| healer 3 | | 20 | | 30 | | 40 | D-mannitol | 10 | gel |
| healer 4 | | 20 | 1,4-butanediol | 60 | 1,2,4-butanetriol | 10 | pentaerythritol ethoxylate | 10 | liquid |
| healer 5 | pentanol | 10 | ethylene glycol | 40 | glycerol | 40 | xylitol | 10 | gel |
| healer 6 | | 10 | 1,4-butanediol | 40 | | 40 | | 10 | liquid |

TABLE 1-continued

| | compositions | | | | | | | |
|---|---|---|---|---|---|---|---|---|
| | monools | | diols | | triols | | multiols | | |
| | species | wt % | species | wt % | species | wt % | species | wt % | state |
| healer 7 | | 20 | | 50 | 1,2,4-butanetriol | 20 | D-mannitol | 10 | sol |
| healer 8 | | 20 | diethylene glycol | 20 | | 40 | pentaerythritol ethoxylate | 20 | liquid |
| healer 9 | | 20 | | 40 | | 30 | | 10 | gel |
| healer 10 | hexanol | 5 | ethylene glycol | 30 | glycerol | 50 | xylitol | 15 | gel |
| healer 11 | | 10 | | 50 | | 20 | pentaerythritol ethoxylate | 20 | liquid |
| healer 12 | | 10 | | 60 | | 20 | D-mannitol | 10 | gel |
| healer 13 | | 10 | 1,4-butanediol | 30 | 1,2,4-butanetriol | 40 | pentaerythritol ethoxylate | 20 | liquid |
| healer 14 | | 10 | | 60 | | 20 | | 10 | liquid |
| healer 15 | | 20 | 1,5-pentane diol | 20 | 1,2,6-hexanetriol | 40 | D-mannitol | 20 | gel |
| healer 16 | | 30 | | 30 | | 20 | | 20 | sol |
| healer 17 | octanol | 5 | ethylene glycol | 20 | glycerol | 60 | pentaerythritol ethoxylate | 15 | liquid |
| healer 18 | | 5 | 1,4-butanediol | 50 | | 30 | | 15 | gel |
| healer 19 | | 10 | 1,5-pentane diol | 20 | | 60 | xylitol | 10 | liquid |
| healer 20 | | 20 | | 50 | 1,2,6-hexanetriol | 20 | D-mannitol | 10 | sol |

Monomer Composition Preparation Example

The monomer compositions 1 to 50 were prepared by mixing the main monomer, the self-healing monomer, and the healer in an amount ratio as described in Table 2 below. The solvent in the monomer compositions was chloroform and the polymerization initiator was 2-hydroxy-2-methyl-propiophenone. The content in the table below shows the respective weight ratios of the mixed weight of the main monomer, the self-healing monomer, and the healer.

The monomers used are as follows.

[Main Monomer A: MM_A, Chemical Formula 24]

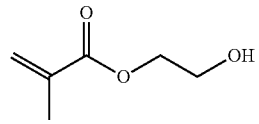

2-hydroxyethyl methacrylate

[Main Monomer B: MM_B, Chemical Formula 25]

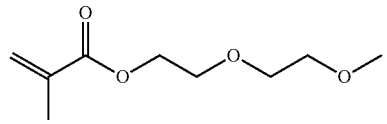

2-(2-methoxyethoxy) ethyl methacrylate

[Main Monomer C: MM_C, Chemical Formula 26]

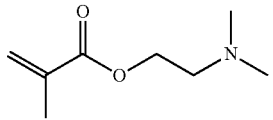

2-(dimethylamino) ethyl methacrylate

[Main Monomer D: MM_D, Chemical Formula 27]

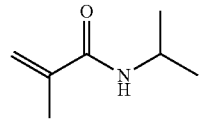

N-isopropyl methacrylamide

[Self-Healing Monomer: SRM_A]

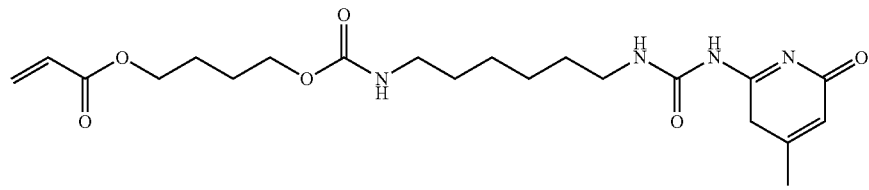

4-(6-(3-(4-methyl-6-oxo-3,6-dihydropyridin-2-yl)ureido)hexylcarbamoyloxy)butyl acrylate

[Self-Healing Monomer: SRM_B]

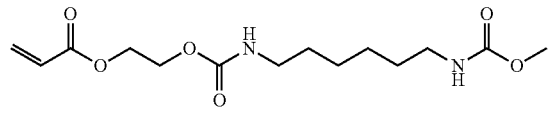

3,12-dioxo-2,13-dioxa-4,11-diazapentadecene-15-yl acrylate

[Self-Healing Monomer: SRM_C]

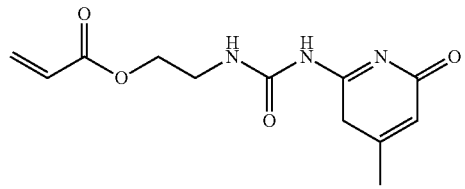

2-(3-(4-methyl-6-oxo-3,6-dihydropyridin-2-yl)ureido ethylacrylate

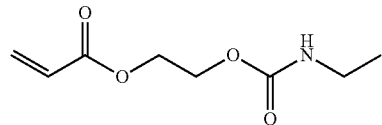

2-(ethylcarbamoyloxy) ethyl acrylate

[Self-Healing Monomer: SRM_D]

TABLE 2

| monomer composition # | composition | | | | | | original tensile strength (gf/mm$^2$) | tensile strength after recovery (gf/mm$^2$) | recovery rate |
|---|---|---|---|---|---|---|---|---|---|
| | main monomer species | wt % | self-healing monomer species | wt % | healer species | wt % | | | |
| 1 | MM_A | 30 | SRM_A | 10 | healer 3 (gel) | 60 | 139 | 99 | 0.71 |
| 2 | | 30 | | 10 | healer 13 (liquid) | 60 | 160 | 139 | 0.87 |
| 3 | | 30 | | 10 | healer 15 (gel) | 60 | 70 | 63 | 0.9 |
| 4 | | 40 | SRM_B | 15 | healer 19 (liquid) | 45 | 94 | 71 | 0.75 |
| 5 | | 40 | SRM_C | 5 | healer 1 (liquid) | 55 | 82 | 69 | 0.84 |
| 6 | | 40 | | 5 | healer 8 (liquid) | 55 | 74 | 55 | 0.74 |
| 7 | | 40 | SRM_B | 5 | healer 12 (gel) | 55 | 79 | 69 | 0.87 |
| 8 | | 50 | | 10 | healer 18 (gel) | 40 | 93 | 86 | 0.92 |
| 9 | | 50 | | 5 | healer 5 (gel) | 45 | 129 | 108 | 0.84 |
| 10 | | 50 | SRM_D | 5 | healer 14 (liquid) | 45 | 114 | 88 | 0.77 |
| 11 | | 60 | | 10 | healer 20 (sol) | 30 | 159 | 138 | 0.87 |
| 12 | MM_B | 30 | SRM_A | 10 | healer 4 (liquid) | 60 | 243 | 214 | 0.88 |
| 13 | | 35 | | 5 | healer 9 (gel) | 60 | 212 | 193 | 0.91 |
| 14 | | 35 | SRM_B | 5 | healer 13 (liquid) | 60 | 189 | 168 | 0.89 |
| 15 | | 30 | SRM_A | 10 | healer 17 (liquid) | 60 | 254 | 198 | 0.78 |
| 16 | | 30 | SRM_C | 15 | healer 2 (gel) | 55 | 208 | 173 | 0.83 |
| 17 | | 40 | | 15 | healer 10 (gel) | 45 | 248 | 211 | 0.85 |
| 18 | | 40 | | 20 | healer 15 (gel) | 40 | 221 | 157 | 0.71 |
| 19 | | 40 | SRM_B | 20 | healer 17 (liquid) | 40 | 185 | 135 | 0.73 |
| 20 | | 50 | | 5 | healer 3 (gel) | 45 | 234 | 192 | 0.82 |
| 21 | | 50 | SRM_D | 5 | healer 13 (liquid) | 45 | 179 | 156 | 0.87 |
| 22 | | 50 | | 10 | healer 17 (liquid) | 40 | 158 | 114 | 0.72 |
| 23 | | 60 | | 10 | healer 19 (liquid) | 30 | 149 | 136 | 0.91 |
| 24 | MM_C | 30 | SRM_B | 10 | healer 1 (liquid) | 60 | 152 | 114 | 0.75 |
| 25 | | 30 | | 10 | healer 7 (sol) | 60 | 130 | 108 | 0.83 |
| 26 | | 30 | SRM_A | 10 | healer 10 (gel) | 60 | 112 | 86 | 0.77 |
| 27 | | 30 | | 10 | healer 14 (liquid) | 60 | 170 | 126 | 0.74 |
| 28 | | 30 | | 10 | healer 18 (gel) | 60 | 145 | 120 | 0.83 |
| 29 | | 40 | SRM_B | 10 | healer 3 (gel) | 50 | 126 | 111 | 0.88 |
| 30 | | 40 | SRM_C | 15 | healer 14 (liquid) | 45 | 103 | 74 | 0.72 |
| 31 | | 40 | | 15 | healer 15 (gel) | 45 | 104 | 97 | 0.93 |
| 32 | | 40 | SRM_B | 20 | healer 19 (liquid) | 40 | 164 | 130 | 0.79 |
| 33 | | 40 | | 5 | healer 1 (liquid) | 55 | 182 | 149 | 0.82 |
| 34 | | 50 | SRM_D | 5 | healer 3 (gel) | 45 | 152 | 116 | 0.76 |
| 35 | | 50 | | 10 | healer 14 (liquid) | 40 | 92 | 82 | 0.89 |
| 36 | | 50 | | 15 | healer 16 (sol) | 35 | 75 | 53 | 0.71 |
| 37 | | 60 | SRM_B | 10 | healer 17 (liquid) | 30 | 87 | 69 | 0.79 |
| 38 | MM_D | 30 | SRM_B | 10 | healer 6 (liquid) | 60 | 129 | 104 | 0.81 |
| 39 | | 30 | SRM_A | 10 | healer 8 (liquid) | 60 | 231 | 196 | 0.85 |
| 40 | | 30 | | 10 | healer 14 (liquid) | 60 | 89 | 69 | 0.78 |
| 41 | | 30 | | 10 | healer 20 (sol) | 60 | 174 | 157 | 0.9 |
| 42 | | 30 | SRM_B | 10 | healer 3 (gel) | 60 | 169 | 134 | 0.79 |
| 43 | | 40 | SRM_C | 5 | healer 10 (gel) | 55 | 205 | 180 | 0.88 |
| 44 | | 40 | SRM_B | 10 | healer 11 (liquid) | 50 | 84 | 71 | 0.84 |
| 45 | | 40 | SRM_C | 10 | healer 16 (sol) | 50 | 157 | 118 | 0.75 |
| 46 | | 40 | | 20 | healer 18 (gel) | 40 | 209 | 163 | 0.78 |
| 47 | | 50 | SRM_B | 5 | healer 2 (gel) | 45 | 184 | 156 | 0.85 |
| 48 | | 50 | SRM_D | 5 | healer 6 (liquid) | 45 | 86 | 63 | 0.73 |
| 49 | | 50 | | 10 | healer 7 (sol) | 40 | 74 | 70 | 0.94 |
| 50 | | 60 | | 10 | healer 16 (sol) | 30 | 65 | 54 | 0.83 |

Polymer Film Preparation Example

Each of the monomer compositions 1 to 50 described in Table 2 above was stirred at 60° C. for 10 minutes to obtain a monomer mixture as a clear liquid. A certain amount of this monomer mixture was dropped onto a 75 μm thick PET film placed on a glass plate. Another 75 μm thick PET film was again covered on the dropped monomer mixture and a doctor blade was used to adjust the thickness of the monomer mixture between PET films to form a monomer mixed film. Thereafter, UV (200-280 nm) was irradiated for 30 minutes on the monomer mixed film interposed between the pair of PET films, and the monomers were photopolymerized to form a polymer film between the pair of PET films.

Polymer Film Comparative Example

A polymer film was manufactured in the same manner as the polymer film preparation example except for using a monomer composition comparative example obtained by mixing hydroxyethyl methacrylate (MM_A) as a main monomer, chloroform as a solvent, and 2-hydroxy-2-methylpropiophenone as a polymerization initiator without using a self-healing monomer and a healer.

Polymer Film Property Evaluation Example

<Evaluation of Tensile Strength after Recovery>

A portion of each of the polymer films obtained through the polymer film preparation examples was subjected to a tensile load until the films broke, thereby measuring the original tensile strength.

Thereafter, the remaining portion of each polymer film was cut with a knife, and then the cut sections were contacted at room temperature for 1 to 3 minutes to obtain a recovered polymer film in which both ends were connected again. Tensile strength after recovery was measured by applying a tensile load until the recovered polymer film broke, and a recovery rate, which is a ratio of the tensile strength after recovery to the original tensile strength, was calculated. The original tensile strength, tensile strength after recovery, and recovery rate are summarized in Table 2 above.

Figure 16A:
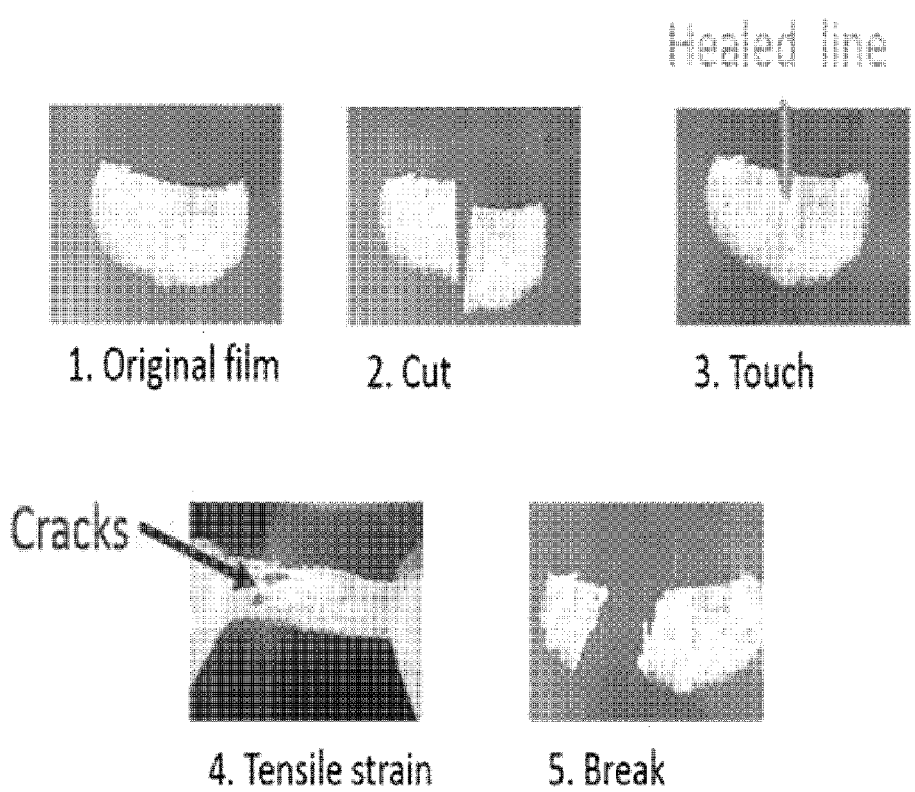
FIG. 16A shows photographs showing a process of cutting, restoring, and breaking a polymer film obtained using the monomer composition 23 of Table 2.
Figure 16B:
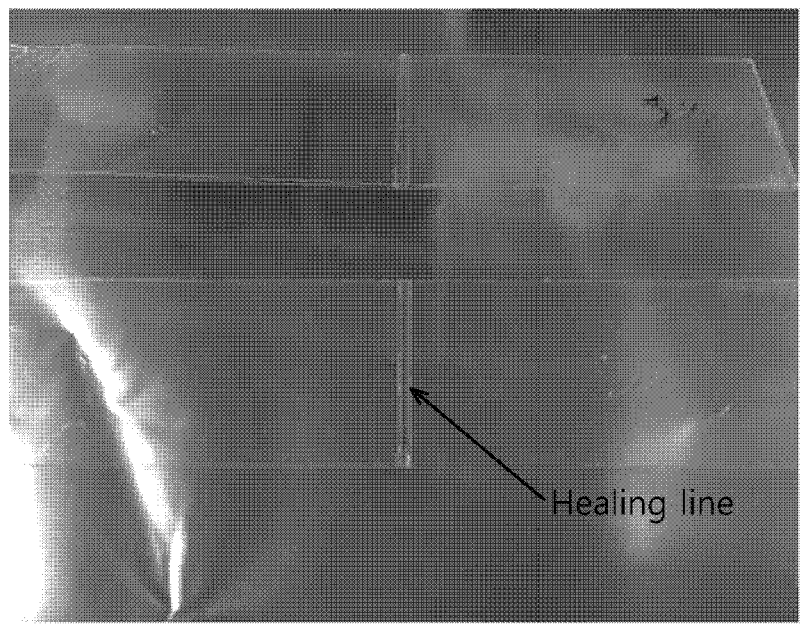
FIG. 16B is a photograph showing a polymer film recovered after being cut.

FIG. 16A shows photographs showing a process of cutting, restoring, and breaking a polymer film obtained using the monomer composition 23 of Table 2, and FIG. 16B is a photograph showing a polymer film recovered after being cut. Here, the polymer film is prepared through the polymer film preparation example, and then the upper and lower PET films are removed.

Referring to FIG. 16A, the polymer film 1 obtained using the monomer composition 23 of Table 2 was cut using a knife and separated into two pieces (2). Thereafter, after contacting the cut surfaces of the two pieces at room temperature, 1 to 3 minutes passed, the two pieces were connected again to obtain a recovered polymer film (3). In this recovered polymer film 3, cut planes were bonded and a bonded line or a healed line was shown. Thereafter, both ends of the recovered polymer film are pulled to generate cracks in the recovered polymer film (4), and then the recovered polymer film may be broken (5). These broken planes may be generated at a location different from the bonded line.

Referring to FIG. 16B, when the polymer film obtained using the monomer composition 23 of Table 2 was cut using a knife and separated into two pieces, then the two pieces were partially overlapped and contacted at room temperature for 1 to 3 minutes, it can be seen that a recovered polymer film in which the two pieces are bonded is obtained.

Table 3 shows the monomer compositions used to prepare the polymer film according to the state of the healer, and average values obtained by averaging the recovery rates (shown in Table 2) of the polymer films obtained from the monomer compositions classified according to the state of the healer.

TABLE 3

| state of the healer | monomer composition # | Average original tensile strength (gf/mm$^2$) | Average tensile strength after recovery (gf/mm$^2$) | Average recovery rate |
|---|---|---|---|---|
| gel | 1, 3, 7, 8, 9, 13, 16, 17, 18, 20, 26, 28, 29, 31, 34, 42, 43, 46, 47 | 159.95 | 132.32 | 0.83 |
| liquid | 2, 4, 5, 6, 10, 12, 14, 15, 19, 21, 22, 23, 24, 27, 30, 32, 33, 35, 37, 38, 39, 40, 44, 48 | 143.75 | 116.25 | 0.80 |

Referring to Table 3, the average original tensile strength and average recovery rate of the polymer film using the healer in the liquid state were 143.75 gf/mm$^2$ and 0.80, respectively, whereas the average original tensile strength and average recovery rate of the polymer film using the healer in the gel state were 159.95 gf/mm$^2$ and 0.83, respectively. From these results, it can be seen that the mechanical property, that is, the tensile strength of the polymer film using the healer in the gel state was improved, and the tensile strength recovery rate was also improved compared to the polymer film using the healer in the liquid state.

Surface Waveform Recovery Evaluation Example

Figure 17:
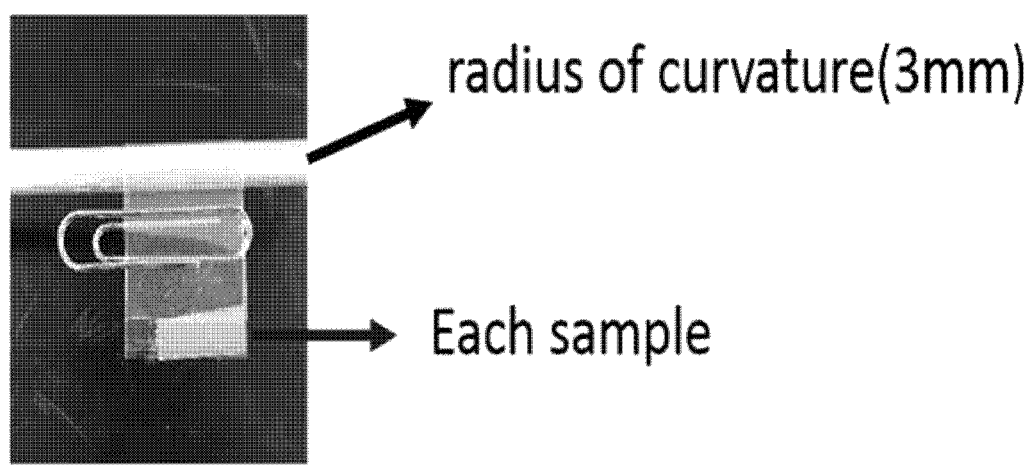
FIG. 17 is a photograph showing a part of the surface waveform recovery evaluation process.

FIG. 17 is a photograph showing a part of the surface waveform recovery evaluation process.

A polymer film interposed between a pair of PET films obtained using the monomer composition 23 of Table 2, that is, PET/the polymer film according to monomer composition 23/PET triple layers was placed and fixed to surround a cylindrical rod having 3 mm of radius of curvature to maintain a static folded state at room temperature for 24 hours. Thereafter, the triple layer was separated from the rod and released in a free state without any fixing to obtain defolded state and the defolded state was maintained for 24 hours.

The polymer film obtained from the polymer film comparative example, that is, PET/PF (polymer film)/PET triple layer, was also subjected to the above-described surface waveform recovery evaluation process.

Figure 18A:
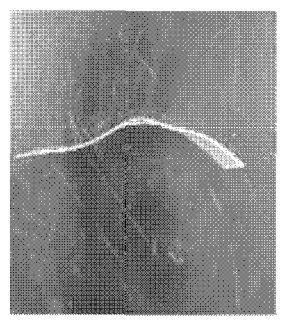
FIGS. 18A and 18B are photographs taken immediately after maintaining a PET/PF (polymer film)/PET triple layer according to the comparative example of the polymer film in the static folded state for 24 hours (A) and immediately after maintaining the defolded state for 24 hours (B), respectively.
Figure 18B:
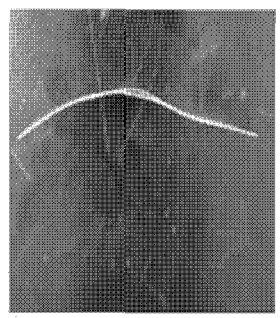
Figure 18C:
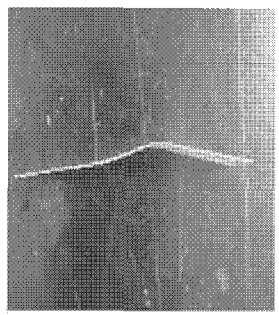
FIGS. 18C and 18D are photographs taken immediately after maintaining a PET/the polymer film according to monomer composition 23/PET triple layer according to the polymer film preparation example in the static folded state for 24 hours (C) and immediately after maintaining the defolded state for 24 hours (D), respectively.
Figure 18D:
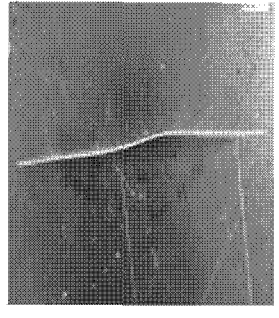
Figure 19A:
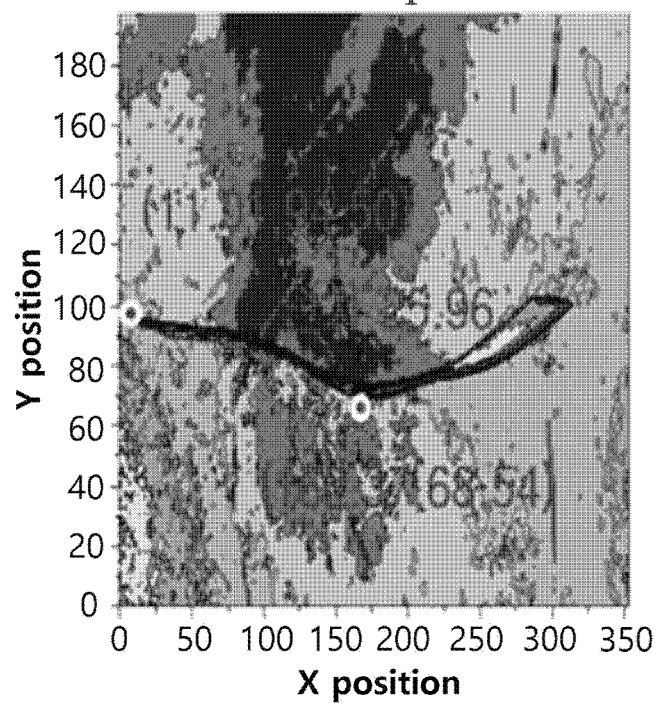
Figure 19B:
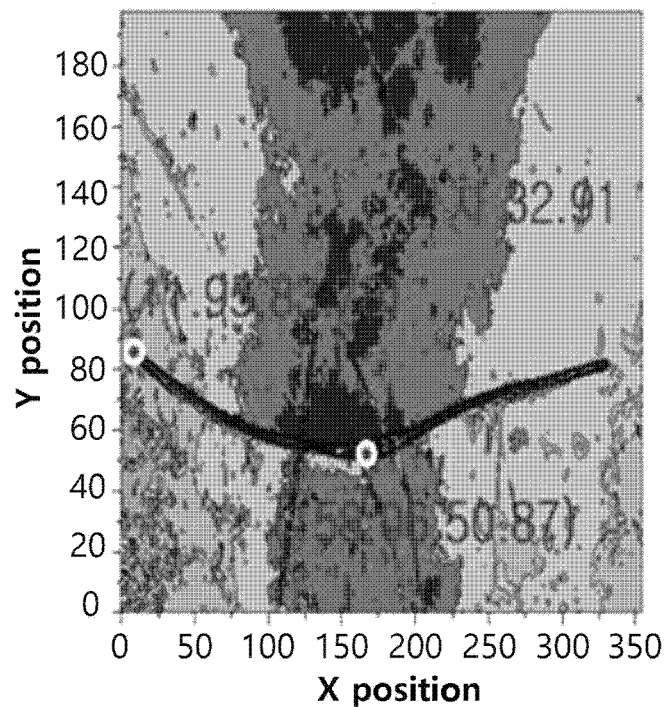
Figure 19C:
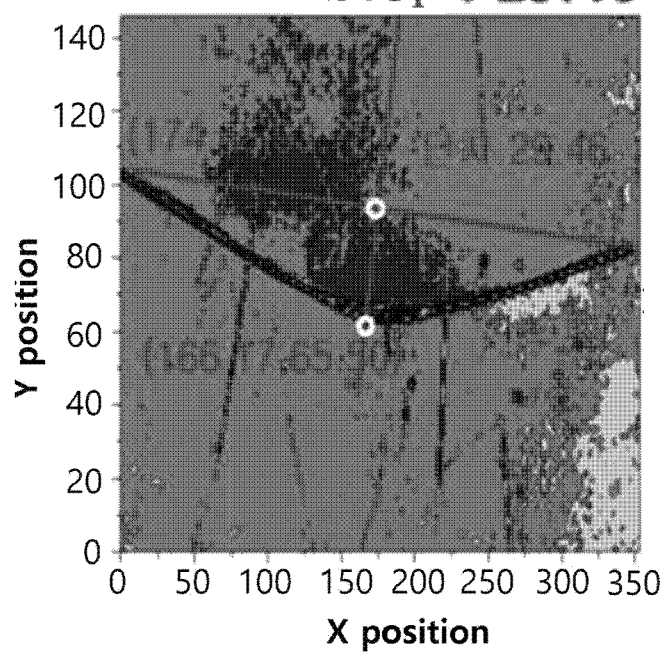

FIGS. 18A and 18B are photographs taken immediately after maintaining a PET/PF (polymer film)/PET triple layer according to the comparative example of the polymer film in the static folded state for 24 hours (A) and immediately after maintaining the defolded state for 24 hours (B), respectively. FIGS. 18C and 18D are photographs taken immediately after maintaining a PET/the polymer film according to monomer composition 23/PET triple layer according to the polymer film preparation example in the static folded state for 24 hours (C) and immediately after maintaining the defolded state for 24 hours (D). FIGS. 19A, 19B, 19C, and 19D show photographs showing wave views from the cases of FIGS. 18A, 18B, 18C, and 18D, respectively.

Referring to FIGS. 18A, 18B, 18C, 18D, 19A, 19B, 19C, and 19D, in case of the PET/polymer film/PET triple layer, in which the polymer film obtained using the main monomer, the self-healing monomer, the healer, and photo initiator according to monomer composition 23, it can be seen that the step, which is the degree of bending of the film, is greatly recovered from 29.46 to 11.91. However, in case of the PET/PF (polymer film)/PET triple layer, in which the polymer film obtained only using the main monomer and photo initiator according to monomer comparative composition, it can be seen that the degree of bending cannot be recovered because the step is changed 25.96 to 32.91.

In the above, the present invention has been described in detail with reference to preferred embodiments, but the present invention is not limited to the above embodiments, and various modifications and changes are possible by those skilled in the art within the spirit and scope of the present invention.

The invention claimed is:

1. A self-healing polymer network comprising:

a polymer derived from monomers including self-healing monomers each having a first polymerizable functional group and at least one of urethane, urea, or amide group chemically linked to the first polymerizable functional group, wherein the polymer has a backbone formed by polymerizing the first polymerizable functional groups of the self-healing monomers and a plurality of side groups each having at least one of urethane, urea, or amide group chemically linked to the backbone; and a physical crosslinking agent which is an alcohol mixture having at least two types of alcohol selected from the group consisting of monool, diol, triol, and polyol having 4 to 6 hydroxyl groups and crosslinking the polymer by physically crosslinking the urethane, urea, or amide group of the side groups, wherein the polymer has a self-healing repeating unit represented by Chemical Formula 3 derived from the self-healing monomer:

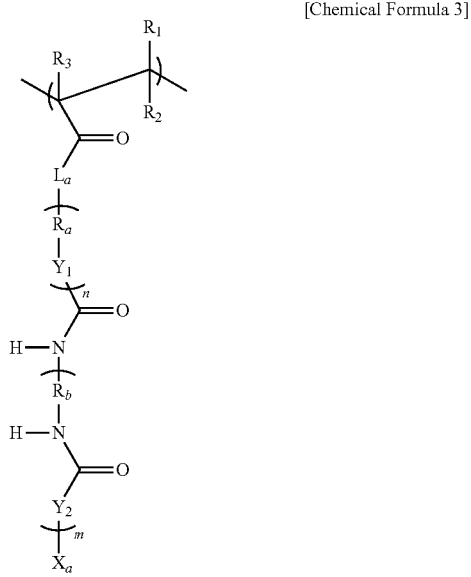

[Chemical Formula 3]

in Chemical Formula 3, $R_1$, $R_2$, and $R_3$ are each independently a hydrogen or a methyl group, $L_a$ is O or NH, $R_a$ is a substituted or unsubstituted C1 to C6 alkyl group or *—$(P_1$-Q$)_a$-$P_2$—*, wherein * represents a bond, $P_1$ and $P_2$ are each independently a substituted or unsubstituted C1 to C6 alkyl group, Q is O or NH, and a is an integer from 1 to 3, $Y_1$ is O or NH, n is an integer of 0 or 1, $R_b$ is a substituted or unsubstituted C1 to C10 alkyl group, a substituted or unsubstituted C1 to C10 aryl group, a substituted or unsubstituted C1 to C10 cycloalkyl group, or *—$(B_1)_b$-$A_1$-$B_2$-$(A_2)_c$-$(B_3)_d$—*, wherein * represents a bond, $A_1$ and $A_2$ are each independently a substituted or unsubstituted C1 to C10 aryl group, a substituted or unsubstituted C1 to C10 cycloalkyl group, a substituted or unsubstituted C1 to C25 diarylalkyl group or a substituted or unsubstituted C1 to C25 dicycloalkylalkyl group, $B_1$ and $B_3$ are each independently a substituted or unsubstituted C1 to C6 alkyl group, $B_2$ is a substituted or unsubstituted C1 to C6 alkyl group or *—N=C=N—*, and b, c, and d are integers of 0 or 1 irrespective of each other, $Y_2$ is O or NH, m is an integer of 0 or 1, $X_a$ is one selected from the group consisting of a hydroxy group, a halogen group, a substituted or unsubstituted amine group, a substituted or unsubstituted C1 to C6 alkyl group, a substituted or unsubstituted C1 to C6 alkenyl group, a substituted or unsubstituted C1 to C6 alkynyl group, a substituted or unsubstituted C1 to C6 oxoalkyl group, a substituted or unsubstituted C1 to C10 aryl group, a substituted or unsubstituted C1 to C10 oxoaryl group, a substituted or unsubstituted C1 to C10 cycloalkyl group, a substituted or unsubstituted C1 to C6 alkylcarboxyl group, a substituted or unsubstituted C1 to C6 alkanol group, a substituted or unsubstituted C1 to C6 alkylmercapto group, a substituted or unsubstituted C1 to C6 alkylsulfonic acid, a substituted or unsubstituted C1 to C6 alkylthiocyanate group, a substituted or unsubstituted C1 to C6 alkylphosphate group, a substituted or unsubstituted C1 to C6 alkylnitro group, a substituted or unsubstituted C1 to C6 alkylnitroso group, a substituted or unsubstituted C1 to C6 alkylnitrile group, a substituted or unsubstituted C1 to C6 alkyl isocyanate group, a substituted or unsubstituted C1 to C5 alkylcyanate group, a substituted or unsubstituted C1 to C5 alkylazo group, a substituted or unsubstituted C1 to C6 alkylazide group, a substituted or unsubstituted C1 to C6 ketimine group, a substitution of C1 to C6 aldimine group, and a substituted or unsubstituted C1 to C6 amide group.

2. The self-healing polymer network of claim 1, wherein both of n and m are 1 in Chemical Formula 3.

3. The self-healing polymer network of claim 1, wherein n is 0 and m is 1 in Chemical Formula 3.

4. The self-healing polymer network of claim 1, wherein n is 1 and m is 0 in Chemical Formula 3.

5. The self-healing polymer network of claim 1, wherein the monomers include main monomers having a higher content by weight than that of the self-healing monomers, in addition to the self-healing monomers, each of the main monomers has a second polymerizable functional group, and the first and the second polymerizable functional groups are functional groups having vinyl groups.

6. A self-healing polymer network comprising:

a polymer derived from monomers including self-healing monomers each having a first polymerizable functional group and at least one of urethane, urea, or amide group chemically linked to the first polymerizable functional group, wherein the polymer has a backbone formed by polymerizing the first polymerizable functional groups of the self-healing monomers and a plurality of side groups each having at least one of urethane, urea, or amide group chemically linked to the backbone; and a physical crosslinking agent which is an alcohol mixture having at least two types of alcohol selected from the group consisting of monool, diol, triol, and polyol having 4 to 6 hydroxyl groups and crosslinking the polymer by physically crosslinking the urethane, urea, or amide group of the side groups, wherein the polymer is a random polymer derived from the self-healing monomers and the main monomers, and represented by Chemical Formula 4:

[Chemical Formula 4]

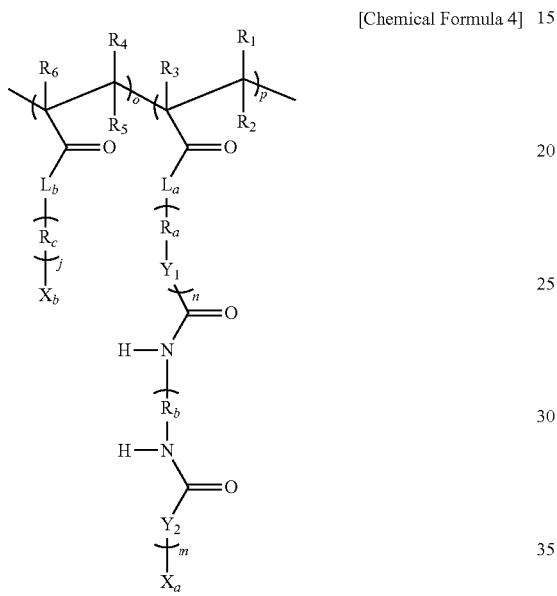

in Chemical Formula 4, $R_1$, $R_2$, $R_3$, $R_4$, $R_5$, and $R_6$, are each independently a hydrogen or a methyl group, $L_a$ and $L_b$ are each independently O or NH, $R_a$ and $R_c$ are each independently a substituted or unsubstituted C1 to C6 alkyl group or *—$(P_1$-$Q)_a$-$P_2$—*, wherein * represents a bond, $P_1$ and $P_2$ are each independently a substituted or unsubstituted C1 to C6 alkyl group, Q is O or NH, and a is an integer from 1 to 3, $Y_1$ is O or NH, n is an integer of 0 or 1, $R_b$ is a substituted or unsubstituted C1 to C10 alkyl group, a substituted or unsubstituted C1 to C10 aryl group, a substituted or unsubstituted C1 to C10 cycloalkyl group, or *—$(B_1)_b$-$A_1$-$B_2$-$(A_2)_c$-$(B_3)_d$—*, wherein * represents a bond, $A_1$ and $A_2$ are each independently a substituted or unsubstituted C1 to C10 aryl group, a substituted or unsubstituted C1 to C10 cycloalkyl group, a substituted or unsubstituted C1 to C25 diarylalkyl group or a substituted or unsubstituted C1 to C25 dicycloalkylalkyl group, $B_1$ and $B_3$ are each independently a substituted or unsubstituted C1 to C6 alkyl group, $B_2$ is a substituted or unsubstituted C1 to C6 alkyl group or *—N=C=N—*, and b, c, and d are integers of 0 or 1 irrespective of each other, $Y_2$ is O or NH, m is an integer of 0 or 1, l is an integer of 0 or 1, $X_a$ and $X_b$ are each independently selected from the group consisting of a hydroxy group, a halogen group, a substituted or unsubstituted amine group, a substituted or unsubstituted C1 to C6 alkyl group, a substituted or unsubstituted C1 to C6 alkenyl group, a substituted or unsubstituted C1 to C6 alkynyl group, a substituted or unsubstituted C1 to C6 oxoalkyl group, a substituted or unsubstituted C1 to C10 aryl group, a substituted or unsubstituted C1 to C10 oxoaryl group, a substituted or unsubstituted C1 to C10 cycloalkyl group, a substituted or unsubstituted C1 to C6 alkylcarboxyl group, a substituted or unsubstituted C1 to C6 alkanol group, a substituted or unsubstituted C1 to C6 alkylmercapto group, a substituted or unsubstituted C1 to C6 alkylsulfonic acid, a substituted or unsubstituted C1 to C6 alkylthiocyanate group, a substituted or unsubstituted C1 to C6 alkylphosphate group, a substituted or unsubstituted C1 to C6 alkylnitro group, a substituted or unsubstituted C1 to C6 alkylnitroso group, a substituted or unsubstituted C1 to C6 alkylnitrile group, a substituted or unsubstituted C1 to C6 alkyl isocyanate group, a substituted or unsubstituted C1 to C5 alkylcyanate group, a substituted or unsubstituted C1 to C5 alkylazo group, a substituted or unsubstituted C1 to C6 alkylazide group, a substituted or unsubstituted C1 to C6 ketimine group, a substitution of C1 to C6 aldimine group, and a substituted or unsubstituted C1 to C6 amide group, o is an integer of 2 or 10000, and p is an integer of 2 or 10000.

7. A self-healing polymer network comprising:
a polymer derived from monomers including self-healing monomers each having a first polymerizable functional group and at least one of urethane, urea, or amide group chemically linked to the first polymerizable functional group, wherein the polymer has a backbone formed by polymerizing the first polymerizable functional groups of the self-healing monomers and a plurality of side groups each having at least one of urethane, urea, or amide group chemically linked to the backbone; and a physical crosslinking agent which is an alcohol mixture having at least two types of alcohol selected from the group consisting of monool, diol, triol, and polyol having 4 to 6 hydroxyl groups and crosslinking the polymer by physically crosslinking the urethane, urea, or amide group of the side groups, wherein the physical crosslinking agent contains 0 to 55 mol % of monool, 20 to 95 mol % of diol, 0 to 60 mol % of triol, and 5 to 20 mol % of polyol having 4 to 6 hydroxyl groups, based on the total amount of the physical crosslinking agent.

8. The self-healing polymer network of claim 1, wherein the physical crosslinking is a crosslinking by hydrogen bonding.

9. An optical device, comprising:
a lower optical substrate;
an upper optical substrate; and
a polymer film disposed between the upper optical substrate and the lower optical substrate and having the self-healing polymer network of claim 1.

* * * * *